(12) United States Patent
Fathalla et al.

(10) Patent No.: US 12,223,065 B1
(45) Date of Patent: Feb. 11, 2025

(54) SEPARATE AUTHORIZATION FOR MANAGING STAGES IN A DATA PIPELINE

(71) Applicant: Amazon Technologies, Inc., Seattle, WA (US)

(72) Inventors: Mohamed Emad El Din Fathalla, Carnation, WA (US); Akshat Vig, Seattle, WA (US); Jeffrey Alan Duffy, Chapin, SC (US); Joseph Robert Idziorek, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 660 days.

(21) Appl. No.: 17/547,934

(22) Filed: Dec. 10, 2021

(51) Int. Cl.
*G06F 21/00* (2013.01)
*G06F 21/60* (2013.01)
*G06F 21/62* (2013.01)

(52) U.S. Cl.
CPC ............ *G06F 21/604* (2013.01); *G06F 21/62* (2013.01)

(58) Field of Classification Search
None
See application file for complete search history.

(56) References Cited

U.S. PATENT DOCUMENTS

| | | | |
|---|---|---|---|
| 5,535,385 A | 7/1996 | Griffin | |
| 6,205,451 B1 | 3/2001 | Norcott et al. | |
| 6,882,993 B1 | 4/2005 | Lawande et al. | |
| 6,889,231 B1 | 5/2005 | Boulder et al. | |
| 8,041,760 B2 | 10/2011 | Mamou et al. | |
| 8,554,801 B2 | 10/2013 | Mack | |
| 8,768,880 B2 | 7/2014 | Erla et al. | |
| 9,317,295 B2 * | 4/2016 | Oh | G06F 9/3871 |
| 9,449,060 B2 | 9/2016 | Dhayapule et al. | |
| 10,891,288 B2 | 1/2021 | Rajaperumal et al. | |
| 11,113,273 B2 | 9/2021 | Deshpande et al. | |
| 11,461,347 B1 * | 10/2022 | Das | G06F 16/2433 |
| 11,526,524 B1 * | 12/2022 | Saulys | G06F 8/34 |
| 11,544,050 B1 * | 1/2023 | Ankit | G06F 11/3668 |
| 11,934,389 B2 * | 3/2024 | Deshpande | G06F 16/2282 |
| 11,941,014 B1 * | 3/2024 | Das | G06F 16/219 |
| 2015/0356494 A1 | 12/2015 | Kolesnikov | |
| 2017/0068595 A1 | 3/2017 | Nautiyal et al. | |
| 2017/0092060 A1 | 3/2017 | Toohey et al. | |
| 2017/0154089 A1 | 6/2017 | Sherman | |
| 2018/0067976 A1 | 3/2018 | Schoppe | |

(Continued)

FOREIGN PATENT DOCUMENTS

WO 2020139079 7/2020

OTHER PUBLICATIONS

International Search Report and Written Opinion from PCT/US2020/062265, mailed Feb. 10, 2021, pp. 1-14.

(Continued)

*Primary Examiner* — Jeffery L Williams
(74) *Attorney, Agent, or Firm* — S. Scott Foster; Kowert, Hood, Munyon, Rankin & Goetzel, P.C.

(57) ABSTRACT

A resource-based authorization control may be added to a data processing service. A control-plane action requested by an account or entity creates a resource-based authorization policy. The resource-based authorization policy pertaining to respective resources allows recurrent data-plane actions to maintain a data flow in a data pipeline to be authorized independent of a separate authorization service.

20 Claims, 11 Drawing Sheets

(56) References Cited

U.S. PATENT DOCUMENTS

| | | | |
|---|---|---|---|
| 2018/0081905 A1 | 3/2018 | Kamath | |
| 2019/0332698 A1* | 10/2019 | Cho | G06F 16/2393 |
| 2020/0012647 A1 | 1/2020 | Johnson, III et al. | |
| 2020/0012715 A1 | 1/2020 | Miller | |
| 2020/0110748 A1 | 4/2020 | Watzke et al. | |
| 2020/0311043 A1 | 10/2020 | Pham et al. | |
| 2020/0334254 A1 | 10/2020 | Arye et al. | |
| 2020/0379993 A1 | 12/2020 | Rajaperumal et al. | |
| 2021/0165782 A1 | 6/2021 | Deshpande et al. | |
| 2021/0165783 A1 | 6/2021 | Papakonstantinou et al. | |
| 2021/0165789 A1 | 6/2021 | Deshpande et al. | |
| 2021/0165803 A1 | 6/2021 | Deshpande et al. | |
| 2021/0248146 A1* | 8/2021 | Fry | G06F 16/285 |
| 2022/0067199 A1* | 3/2022 | Taber | G06F 21/6254 |
| 2022/0114509 A1* | 4/2022 | Pinheiro | G06Q 10/0637 |
| 2024/0303924 A1* | 9/2024 | Zhang | G06T 17/05 |

OTHER PUBLICATIONS

Johnson, Theodore, et al., "Update Propagation in a Streaming Warehouse," In International Conference on Scientific and Statistical Database Management 2011, Lecture Notes in Computer Science, vol. 6809, Jul. 20, 2011, pp. 129-149, Springer, Berlin, Heidelberg.

U.S. Appl. No. 17/466,347, filed Sep. 3, 2021, Deshpande, et al.

U.S. Appl. No. 17/362,729, filed Jun. 29, 2021, Jindal et al.

U.S. Appl. No. 17/362,743, filed Jun. 29, 2021, Papakonstantinou, et al.

* cited by examiner

SEPARATE AUTHORIZATION FOR MANAGING STAGES IN A DATA PIPELINE

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the number, size and complexity of data storage and management technologies that are used to perform various operations and services, such as utilizing the features of database systems, object stores, and data streams, which in turn escalate the cost and complexity of maintaining the information. Moreover, as different data storage technologies offer different performance benefits and features, tailoring the location of data to a data storage technology that provides performance and analysis benefits for that data may result in different data sets being spread across many different locations and types of storage systems. While utilizing such a deployment strategy for individual data sets offers some benefit to the individual data sets, some systems or applications may need access to multiple different data sets in order to operate, which may be challenging given the various interfaces, languages, and other technological hurdles that occur when accessing multiple data storage systems. Thus, techniques that may obtain and co-locate data from disparate data storage systems for systems or applications that use data from the disparate storage systems, without removing the data from their optimized source storage locations, may be highly desirable.

Figure 1:
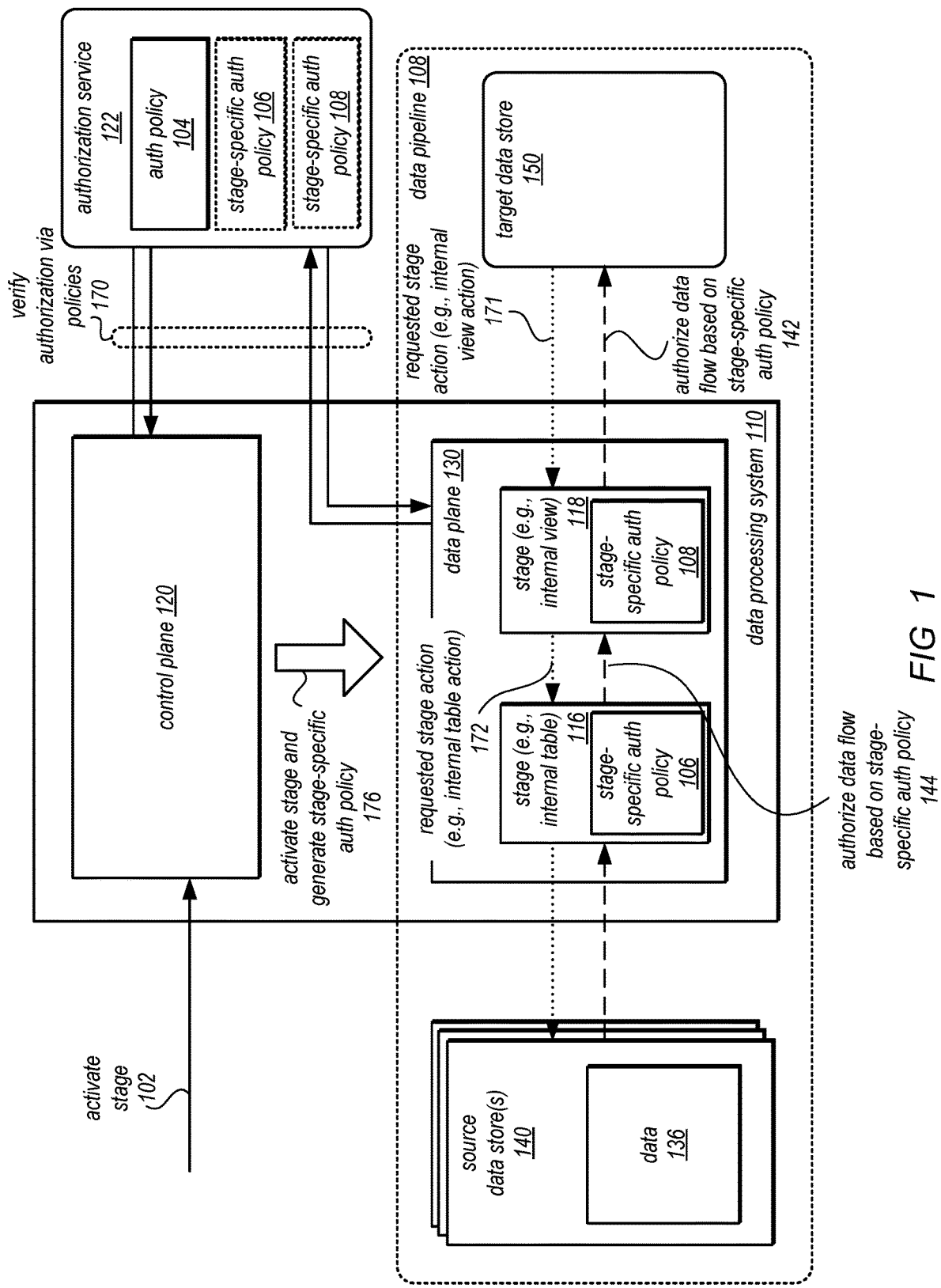
FIG. 1 is a logical block diagram illustrating a data processing system that uses resource-based authorization policies to maintain a data flow of a data pipeline, according to some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (e.g., meaning having the potential to), rather than the mandatory sense (e.g., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques of providing resource-based authorization control for self-maintaining tables/views of a pipeline capable of performing refresh action on a continuing basis are described herein. Different systems, applications, or services store data in multiple purpose-built databases or other data storage or processing technologies to ensure they use the right tool for the job at hand. However, there are many use cases that combine data from multiple such databases, data stores, or other types of data sources. For example, an application implementing an online multiplayer game may need to track player profile data, player behavior, and offer in-game promotions. The application might keep player profile data in a low-latency non-relational (e.g., NoSQL) database, game events in an indexing service, player behavior analytics in a data warehouse service, and promotion catalog in a document database. To build a dashboard of top players and their game activities, an Extract Transform and Load (ETL) service could be used to set up pipelines that extract, transform, and combine data from these disparate systems into a single data store, such as a data caching service, in order to host the dashboard and do activities such as in-game promotion targeting. While such an approach may work for batch updates, keeping the dashboard updated in near real-time would have to rely upon writing significant custom code. The costs to create the custom code for complex integration and pre-computation workflows may increase as fast changing underlying data sources would cause further refinements or changes. Use cases and patterns like the example above exist in virtually every industry, decreasing system performance and increasing implementation costs.

In various embodiments, a data processing system, such as a view management system, may simplify operational workloads by making it easy to move data and/or create views (e.g., materialized or federated query results) that integrate data from multiple sources, storing these views in a specified target database, and, in the scenario for materialized views, keeping the views up-to-date in near real-time as the underlying data changes (instead of, for instance, relying upon making batch-based sets of changes). These source/target data stores could be within a same cloud provider or across multiple different cloud providers. In some embodiments, the source/target data stores may be on-premises sources/targets. The materialized view management service may retrieve data from one or more source data store, transform the data, and then apply it to one or more target data stores. As discussed in detail below with regard to FIGS. 2-7, a materialized view management service may offer a serverless experience for client applications while also offering high performance. For example, in various embodiments, the materialized view management service may scale automatically to ingest large volumes of source data changes and to perform computations to construct the views. Because the materialized view management service may be serverless, in some embodiments, a client application (or developers for the client application) will not have to setup infrastructure, provision capacity, or configure read and write limits. The materialized view management service may instead receive a materialized view definition that specifies data sources, the integration of data from the different data sources, and a target (or multiple targets) to store the materialized views. Other view management systems may be implemented, in some embodiments, that support federated querying across multiple data stores to a target data store with maintaining the view in materialized fashion (e.g., continuing to update the view).

The materialized view management service often maintains these views through explicit actions initiated (through an application programming interface (API) or SQL command) by a separate client or another entity having the required authorization. The materialized view management service refreshes the views by analyzing the authorization policy that is attached to the entity to determine whether the entity has permission to perform the actions. However, maintenance of the views using such entity-based authorizations has a number of drawbacks. An entity-based authorization results in increased overhead. For example, such controls require maintaining a list of "owners" or authorized entities for each and every resource—this overhead increases as the number of entities allowed for a resource increases. Moreover, the permissions for the owners may change over time and this adds additional complexity by coupling the materialized view management service with one or more security services that maintain permissions/ authorizations for the owners. Another drawback of an entity-based authorization is the generation of orphaned resources in the case where the owners are removed from having access to the materialized view management service. In some cases, if a policy granting an entity permission to refresh were to be accidentally modified, it may lead to a revocation of that access and would immediately disrupt the continuous refresh for resources owned by that entity. These and other drawbacks may be difficult to troubleshoot and prove disruptive to the overall operation of the materialized view management service. A materialized view management service using resource-based authorization control instead of, or in conjunction with, an entity-based authorization control may remedy these and other drawbacks.

In some embodiments, a resource-based authorization control may comprise two types of actions-a one-time control-plane action taken by the entity that changes the resource authorization policy and initiates data streaming and a data-plane data streaming action involves recurrent refresh actions to maintain the data flow in the data pipeline. Once authorized control-plane actions initiate data streaming by creating the data pipeline and activating the data pipeline, a subsequent data-plane action call may be made to create resource-based authorization policies granting permissions for associated data streaming actions to continue. Such resource-based authorization control provides security, maintains pipeline resiliency, and prevents unnecessary coupling between the security service and the materialized view management service.

FIG. 1 illustrates a logical block diagram illustrating a data processing system that uses stage-specific authorization policies to maintain a data flow of a data pipeline, according to some embodiments. Data processing system 110, may be a view management system, such as materialized view management service 210 as discussed below with regard to FIGS. 2-7 implemented as part of a provider network or implemented as part of a private or on-premise network, or, in some embodiments, a view management system that may generate and store a federated view in a specified location (e.g., for further analysis) without performing further updates, or other data processing system that moves data from source data stores to target data stores (e.g., Extract Transform Load (ETL) systems, data stream processing systems, etc.). Data processing system 110 may store data, such as data 136 (e.g., creating views, moving, and transforming data, storing, or reformatting data streams, and so on) from different numbers and types of source data sources 140 and store the resultant data 136 in one (or more) target data store(s) 150.

In some embodiments, a data pipeline 108 may include the data processing system 110, wherein the data pipeline may take raw data 136 from one or more sources data stores 140, process the data 136, and move or materialize the data 136 to a target data store 150 for storage and analysis. Each of the source data stores 140, data processing service 110, and target data store 150 in the data pipeline 108 may utilize various authentication mechanisms, resources, and actions. In the data processing system 110, actions requested through a control plane 120 of the data processing system 110 may be authorized using an authorization service 122. For example, an activate stage 102 action is performed upon verification 170 of the authorization policy 104 at the authorization service 122 (e.g., by performing a lookup operation to identify policies attached to or affecting an account associated with activate stage request 102).

In some embodiments, the data processing system 110, source data store 140 and target pipeline 108 may utilize a unified authorization mechanism where all authorization of data pipeline 108 is performed via policies maintained directly or indirectly by the authorization service 122 or another identity and access management (IAM) service. To create the pipeline 108, various control plane 120 actions creating the various stages may be requested (e.g., requests for actions such as create stage 116, 118 replicate data 136 from a source data store 140 to the stage 116, etc. The authorization service 122 receives the authorization policy 104 for an entity (e.g., a user, a group, a role, an account, etc.) as part of a request (not illustrated) to attach the policy to the entity to each of the control-plane requests and verifies that the entity has permission to perform the requested actions.

Once the authorization service 122 verifies the authorization policy 104 of the entity initiating the activate stage 102 action has permission, the data processing service 110 may activate internal view of the pipeline 108 and generate one or more stage-specific authorization policies 176. A stage may be a resource or a component of the data processing service 110 that stores or processes data, such as a source table, an internal table, an internal view, or a materialized view.

Although FIG. 1 illustrates creation of stage-specific authorization policies 106, 108 based on the activate stage 102 action, various other actions may trigger similar generation of one or more stage-specific authorization policies. For example, various control plane actions involved in the creation of the data pipeline 108 described above such as create internal table, replicate data from the source table, create internal view, etc. may also trigger one or more stage-specific authorization policies associated with the stages 116, 118 (e.g., internal table/internal view) to be created or updated.

The stage-specific authorization policies 106, 108 in some embodiments may be created and stored in authorization service 122 or in the data processing system 110 itself. For example, the stage-specific policies may be attached to objects representing the stages 116 and 118 in authorization service 122, which may evaluate authorization for actions by looking up and evaluating policies attached to an object (e.g., a lookup for a stage may evaluate the stage-specific policies attached to that stage object). Authorization service 122 may enforce these stage-specific policies separate from the authorization policy 104 that allows activation of a stage, which may allow continuous or repeated actions enabling data flow of a pipeline without regard to the continuing existence or state of authorization policy 104. For example, authorization policy 104 could be changed to de-authorize the account from activating stages 116 and 118. Such a change to authorization policy 104, however, would not affect the stage-specific authorization policies. As a result, data flow based on those stage-specific policies may continue.

For example, a stage action 171 requested by the target data store 150 may be authorized according to stage specific authorization policy 108. In some embodiments, the stage-specific authorization policies 106, 108 may be attached to a single stage, such as an internal table or an internal view, and may only affect the stage to which it is attached to. For example, a read stage action affecting a stage different than the internal table to which the stage-specific authorization policy is attached to may not be authorized by that policy. In some embodiments, a stage-specific authorization policy may only authorize actions that match the stage type. For example, if the stage-specific authorization policy 106 were attached to an internal table, a requested stage action 172 actions must be a table action for data flow to be authorized based on stage-specific auth policy 144.

Stage-specific authorization policy 108 attached to an internal table may only authorize table actions, and stage-specific authorization policy 108 attached to an internal view may only authorize view actions. In some embodiments, only a subset of available stage actions may be authorized using stage-specific policies including get table, get table schema, read table, get view, get view schema, materialize view, read view, etc. These subsets may be limited only to the actions that are required for maintaining the data flow. In some embodiments, the stage-specific authorization policy may be generated by determining a unique resource name of a stage, creating a stage-specific authorization policy document (e.g., a JSON document), and describing the authorization policy of the stage (e.g., by one or more statements allowing or denying actions with respect to stage 118) by associating the stage-specific authorization policy to the stage using an API using the unique resource name.

After the stages 116, 118 are activated and one or more stage-specific authorization policies are generated, the data processing service 110 may maintain the data flow of the data pipeline 108 through recurrent data streaming actions occurring in a data-plane 130. For example, the data 136 in respective stages 116, 118 may be accessed by a target data store, such as target data store 150 via requested stage action 171 (e.g., queries, data pull requests, downloads, etc.). An interface supported by the target data store 150 may be used to access the stages 116, 118, in various embodiments. For example, a SQL query may be made to access data stored as a view if target data store 150 is a relational database that supports SQL. If, however, target data store 150 were stored in a non-relational database, then a request according to the programming language or interface of the non-relational database may be used to access the stored data instead. In this way, data may be deployed to targets that support the desired features for analyzing and accessing the data. In some embodiments, a requested action may be an internal action of the data processing service 110. For example, stage-requested action 172 from one stage 118 to another stage 116 internal table may be an internal request for data 136 in an internal table by an internal view to populate its view. There may be multiple stages in the data plane 130 that are part of various data pipelines. In some embodiments, the internal view 118 may be a resource associated with the same entity that created the internal table 116 or may be associated with a different entity in cross-account configurations.

A data processing job, such as activate stage 102 for instance, may specify the source data store, target data store, and various other data processing operations that may be performed. Consider an example where the activate stage 102 action is to materialize an internal view. The materialized view may be specified according to a view definition that may be provided to data processing system 110, in various embodiments. For example, in some embodiments, a user interface or other type of interface (e.g., an Application Programming Interface (API)) may be used to specify the data processing job, including the desired results (e.g., scan, get, join, aggregate, etc.), sources (e.g., by selecting source data stores 140 from a list of offered sources), and targets (e.g., by selecting target(s) 150 from a list of offered targets). In some embodiments, target data store 150 may be one of the source data stores 140 (e.g., with the view stored in a different location, such as a different table in a same database). In at least some embodiments, the data processing job may be specified in a query language (e.g., PartiQL or other structured query language (SQL)-like language).

Source data stores 140 may involve many different types of data storage, processing, and/or management technologies, in some embodiments. For example, source data stores 140 may be various types of databases (including relational databases, non-relational databases, graph databases, document databases, time series databases, data warehouses, or various other types of databases). In another example, source data stores 140 may include various data streaming services or services (e.g., data streams for data feeds, events, or other stream processing techniques). In some embodiments, source data stores 140 may be messaging, notification, or other communication services or services. Various combinations of the different example data sources may be used or combined to create a materialized view (e.g., a materialized view that joins a database table with a data stream). Similarly target data store 150 may be various types of data storage, processing, and/or management technologies, such as the examples given above.

Once data processing system 110 stores data 136 in target data store 150 in the materialized view, data processing system 110 may also update data (e.g., as materialized view) to provide near real-time updates, in some embodiments. In this way, data 136 may provide up-to-date changes when queried or analyzed. For example, as different changes are made to (or by) data sources 140, these changes may be obtained by data processing system 110.

Please note that the previous description of a data processing system is a logical illustration and thus is not to be construed as limiting as to the implementation of data sources, targets, views, or various other features. Different combinations or implementations may be implemented in various embodiments.

This specification begins with a general description of a provider network that implements a materialized view management service. Then various examples of a materialized view management service including different components/modules, or arrangements of components/module that may be employed as part of implementing the materialized view management service are discussed. A number of different methods and techniques to implement providing stage-specific authorization control for self-maintaining tables/views of a pipeline capable of performing refresh action on a continuing basis are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
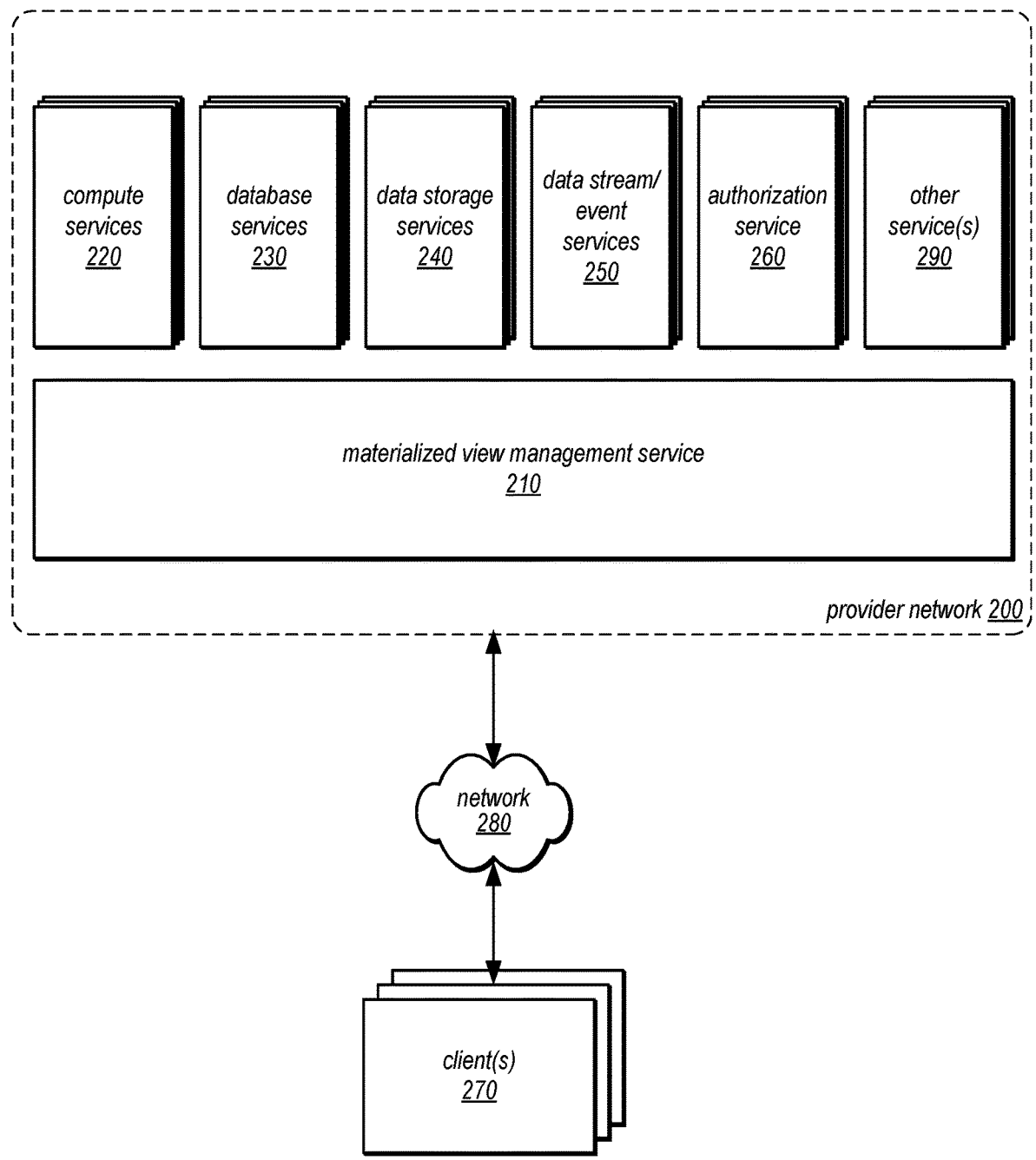
FIG. 2 is a logical block diagram illustrating a provider network offering a materialized view management service and other services, including various data storage and processing services, that allows resource-based authorization control for self-maintaining tables/views of a pipeline capable of performing refresh action on a continuing basis, according to some embodiments.

FIG. 2 is a logical block diagram illustrating a provider network offering a materialized view management service and other services, including various data storage and processing services, that allows resource-based authorization control for self-maintaining tables/views of a pipeline capable of performing refresh action on a continuing basis, according to some embodiments. Provider network 200 may be a private or closed system or may be set up by a user such as a company or a public sector organization to provide one or more services (such as various types of cloud-based storage) accessible via the Internet and/or other networks to clients 270, in some embodiments. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and services offered by the provider network 200.

In some embodiments, provider network 200 may implement various computing systems, services, resources, or services, such as a materialized view management service 210, compute services 220, database service(s) 230, (e.g., relational or non-relational (NoSQL) database query engines, map reduce processing, data flow processing, and/or other large scale data processing techniques), data storage service(s) 240, (e.g., an object storage service, block-based storage service, or data storage service that may store different types of data for centralized access), data stream and/or event services 250, authorization service 260 (e.g., IAM services that specify which entities may access which services and resources, and under which conditions actions may be performed), and other services 290 (any other type of network based services which may include various other types of storage, processing, analysis, communication, event handling, visualization, and authorization/security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Compute services 210 may be implemented by provider network 200, in some embodiments. Compute services 210 may offer instances, containers, and/or functions according to various configurations for client(s) 270 operation. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A container may provide a virtual operation system or other operating environment for executing or implementing applications. A function may be implemented as one or more operations that are performed upon request or in response to an event, which may be automatically scaled to provide the appropriate number computing resources to perform the operations in accordance with the number requests or events. A number of different types of computing devices may be used singly or in combination to implement the compute instances, containers, and/or functions and of provider network 200 in different embodiments, including general purpose or special purpose computer servers, storage devices, network devices and the like. In some embodiments instance client(s) 270 or other any other user may be configured (and/or authorized) to direct network traffic to a compute instance.

Compute instances, containers, and/or functions may operate or implement a variety of different services, such as application server instances, general purpose or special-purpose operating systems, services that support various interpreted or compiled programming languages such as Ruby, Perl, Python, C, C++ and the like, or high-performance computing services) suitable for performing client(s)

270 applications, without for example requiring the client(s) 270 to access an instance. Applications (or other software operated/implemented by a compute instance and may be specified by client(s), such as custom and/or off-the-shelf software.

In some embodiments, compute instances, containers, and/or functions have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances, containers, and/or functions with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, containers, and/or functions, such as a particular number of virtual CPU cores, memory, cache, storage, as well as any other performance characteristic. Configurations of compute instances, containers, and/or functions may also include their location, in a particular data center, availability zone, geographic, location, etc. as well as (in the case of reserved compute instances, containers, and/or functions) reservation term length.

In various embodiments, database services 230 may be various types of data processing services that perform general or specialized data processing functions (e.g., analytics, big data querying, time-series data, graph data, document data, relational data, non-relational data, structured data, semi-structured data, unstructured data, or any other type of data processing operation) over data that is stored across multiple storage locations, in some embodiments. For example, in at least some embodiments, database services 210 may include various types of database services (e.g., relational) for storing, querying, and updating data. Such services may be enterprise-class database systems that are scalable and extensible. Queries may be directed to a database in database service(s) 230 that is distributed across multiple physical resources, as discussed below, and the database system may be scaled up or down on an as needed basis, in some embodiments. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system or via Application Programming Interfaces (APIs). In other embodiments, external applications and programs may submit queries using Open Database Connectivity (ODBC) and/or Java Database Connectivity (JDBC) driver interfaces to the database system.

In some embodiments, database service(s) 230 may include services that process requests to data that is not stored in fully structured storage (e.g., non-relational or NoSQL databases). Database services 230 may access the data that is semi-structured or not-structured in storage, such as data objects of unstructured or semi-structured data in a separate data storage service, in one embodiment. In other embodiments, database services 230 may locally store, managed, and access semi-structured or not-structured data.

In some embodiments, database services 220 may be various types of data processing services to perform different functions (e.g., query or other processing engines to perform functions such as anomaly detection, machine learning, data lookup, or any other type of data processing operation). For example, in at least some embodiments, database services 230 may include a map reduce service that creates clusters of processing nodes that implement map reduce functionality over data stored in one of data storage services 240. Various other distributed processing architectures and techniques may be implemented by database services 230 (e.g., grid computing, sharding, distributed hashing, etc.). Note that in some embodiments, data processing operations may be implemented as part of data storage service(s) 230 (e.g., query engines processing requests for specified data).

Data storage service(s) 240 may implement different types of data stores for storing, accessing, and managing data on behalf of clients 270 as a network-based service that enables clients 270 to operate a data storage system in a cloud or network computing environment. For example, one data storage service 230 may be implemented as a centralized data store so that other data storage services may access data stored in the centralized data store for processing and or storing within the other data storage services, in some embodiments. Such a data storage service 240 may be implemented as an object-based data store and may provide storage and access to various kinds of object or file data stores for putting, updating, and getting various types, sizes, or collections of data objects or files. Such data storage service(s) 230 may be accessed via programmatic interfaces (e.g., APIs) or graphical user interfaces. A data storage service 240 may provide virtual block-based storage for maintaining data as part of data volumes that may be mounted or accessed similar to local block-based storage devices (e.g., hard disk drives, solid state drives, etc.) and may be accessed utilizing block-based data storage protocols or interfaces, such as internet small computer interface (iSCSI).

In various embodiments, data stream and/or event services 250 may provide resources to ingest, buffer, and process streaming data in real-time. In some embodiments, data stream and/or event services 250 may act as an event bus or other communications/notifications for event driven systems or services (e.g., events that occur on provider network 200 services and/or on-premises systems or applications).

Authorization service 260 may receive an authorization policy or other IAM resources comprising user, group, role, or identity provider objects and determine whether the authorization policy grants permission to perform certain actions. The authorization service 260 allows polices to be added, edited, and removed from the authorization service. The authorization service 260 may store multiple authorization polices from different accounts or entities. In some embodiments, the authorization service 260 may receive control-plane actions and once determine to have permission, the materialized view management service 210 may generate one or more resource-based policies that may be used to determine future data-plane actions.

Generally speaking, clients 270 may encompass any type of client configurable to submit network-based requests to provider network 200 via network 280, including requests for materialized view management service 210 (e.g., a request to create a materialized view from different data sources of the other provider network services and identify one or more as a target data source). For example, a given client 270 may include a suitable version of a web browser or may include a plug-in module or other type of code module that may execute as an extension to or within an execution environment provided by a web browser. Alternatively, a client 270 may encompass an application such as a database application (or user interface thereof), a media application, an office application or any other application that may make use of resources in in provider network 200 to implement various features, systems, or applications. (e.g., to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application may interact directly with provider network 200. In some embodiments, client 270 may generate network-based services requests according to a Representational State Transfer (REST)-style network-based services architecture, a document-based or message-based network-based services architecture, or another suitable network-based services architecture.

In some embodiments, a client 270 may provide access to provider network 200 to other applications in a manner that is transparent to those applications. For example, client 270 may integrate with an operating system or file system to provide storage on one of data storage service(s) 240 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 240 may be coordinated by client 270 and the operating system or file system on behalf of applications executing within the operating system environment.

Clients 270 may convey network-based services requests (e.g., materialized view creation requests) to and receive responses from provider network 200 via network 280. In various embodiments, network 280 may encompass any suitable combination of networking hardware and protocols necessary to establish network-based-based communications between clients 270 and provider network 200. For example, network 280 may generally encompass the various telecommunications networks and service providers that collectively implement the Internet. Network 280 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 280 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and provider network 200. It is noted that in some embodiments, clients 270 may communicate with provider network 200 using a private network rather than the public Internet.

Figure 3:
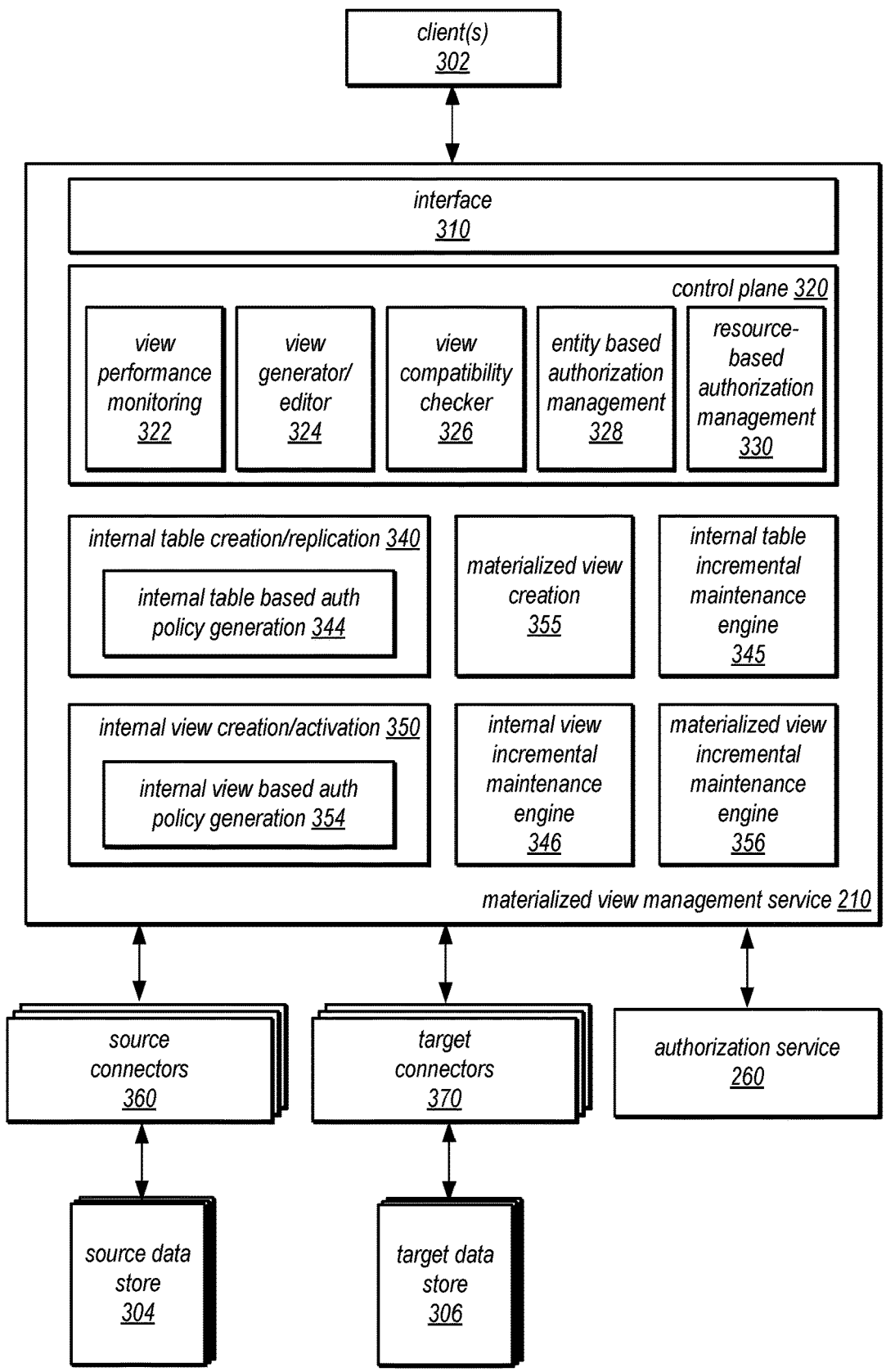
FIG. 3 is a logical block diagram illustrating a materialized view management service that implements resource-based authorization policies to maintain a data flow of a data pipeline, according to some embodiments.

FIG. 3 is a logical block diagram illustrating a materialized view management service that implements resource-based authorization policies to maintain a data flow of a data pipeline, according to some embodiments. Client(s) 302 (which may be similar to client(s) 270 in FIG. 2 or other types of client systems, services, or applications). Client(s) 302 may access materialized view management service 210 via interface 310. Interface 310 may be a graphical user interface (e.g., implemented as a console or other graphical control view a website). Interface 310 may be implemented as a command line interface, in some embodiments. Interface 310 maybe implemented as one or multiple programmatic interfaces, (e.g., one or more APIs). As discussed with regard to FIGS. 4-5, various types of requests may be received and/or responses sent.

Materialized view management service 210 may implement control plane 320. Control plane 320 may implement various features for managing the resources and operations for creating and maintaining materialized views. For example, entity-based authorization management 328 may implement various access control mechanisms or authentication techniques to ensure that requests to create materialized views are made with appropriate authorization (e.g., to create or delete a materialized view). The entity-based authorization management 328 may communicate with an authorization service 260 (which may be similar to authorization service 122 in FIG. 1) by sending one or more lookup requests to determine authorization of various accounts or entities to initiate performance of an action by the materialized view management service 210 according to policies attached to corresponding objects in authorization service 260. In some embodiments, the control plane 320 may implement various health or other system monitoring features to ensure that various features or components of materialized view management service are functioning correctly, repaired, or replaced. For example, control plane 320 may monitor a number of nodes or instances used to implement view creation/activation 350 and materialized view incremental maintenance engine(s), such as may be collected in pools or groups of instances, and replace, increase, or decrease the number of nodes or instances in order to meet demand or handle failures.

As indicated in FIG. 3, control plane 320 may implement view performance monitoring 322 in order to monitor the performance of creating and maintaining a materialized view, in some embodiments. For example, view performance monitoring 322 may collect or request performance metrics for change data capture, view computation, and view materialization to send the results to target data stores and determine whether or not performance criteria for the view has been met. For example, performance criteria may include a lag time or other indicator for the time between when a change occurs at a source and when the change is included in an update made to a target. If the lag time exceeds a threshold amount of time (e.g., 15 minutes), then an adjustment event to reduce the lag time may be triggered. Other performance criteria may include the amount of data that is being received as a change (e.g., how many records, items or objects, or the size of data, such as 5 megabytes). Performance criteria may include criteria specified for the materialized view by a user, owner, developer, or operator via view interface 310. In some embodiments, the specified requirements may include limitations or other restrictions on the utilization of some resources (e.g., a limit on the amount of read or write load placed on a data source or target).

Control plane 320 may implement view performance adjustments to dynamically scale the resources associated with creating and maintaining a materialized view. In this way, a serverless experience may be provided, as the provisioning, management, allocation of resources may be handled by materialized view management service 210 (instead of by a user that is manually specifying the amount resources to implement for a materialized view. View performance adjustments may determine responsive actions to adjust materialized view creation 355 and performance according to view performance monitoring 322 (e.g., according to the number and/or type of events detected). For example, view performance adjustments may increase (or decrease) the number of nodes assigned to view maintenance processing in order to keep pace with an increased number of changes received from data sources.

In various embodiments, control plane 320 may maintain, update, and/or access internal view state. Internal view state may indicate the state of various materialized views as the progress between creation and maintenance phases as well as other state information that informs operations or workflows performed on behalf of a materialized view. For example, internal view state may indicate in state information for a materialized view that the target for that the last maintenance operation to update a materialized view occurred 10 minutes ago and that another check for updates should be performed. Internal view state may identify and/or provide information for various features of a materialized view creation 355 and materialized view maintenance 356. A view compatibility checker 326 may be implemented to detect incompatibility of a view definition with target data store's type system, in some embodiments. View compatibility checker 326 could alternatively be implemented as part of materialized view creation 355 and/or as part of run-time evaluations of materialized view incremental maintenance engine(s) 356.

Internal table creation/replication 340 may handle requests to create an internal table and replicate data from a source data store. For example, internal table creation/replication 340 may perform initial creation of a table containing only the schema of a source table in the source data store, then replicate the data from the source table. In some embodiments, internal table creation/replication 340 may subsequently result in internal table-based authorization policy generation 344 that specifies which resources and actions are granted permission to access the internal table as further discussed in FIGS. 4-7. In some embodiments, internal table creation/replication 340 may store the maintenance or other execution plan along with other artifacts to facilitate the internal table in the materialized view management service 210. Similarly, internal view creation/activation 350 may handle requests to create an internal view from one or more internal tables and activate the internal view to process data from the internal tables. For example, internal view creation/activation 350 may perform initial creation of a view based on one or more portions of the internal tables, then processes the data only upon activation of the view. In some embodiments, internal view creation/activation 350 may subsequently result in internal view-based authorization policy generation 354 that specifies which resources and actions are granted permission to access the internal view as further discussed in FIGS. 4-7. In some embodiments, internal view creation/activation creation 354 may store the maintenance or other execution plan along with other artifacts to facilitate the internal view in the materialized view management service 210.

Materialized view creation 355 may handle requests to create a materialized view. For example, materialized view creation 355 may perform initial validation of a view, such as checking the string length and basic structure. In some embodiments, materialized view creation 355 may generate maintenance or other execution plan to create and update the materialized view. In some embodiments, materialized view creation 355 may store the maintenance or other execution plan along with other artifacts to facilitate the materialized view in an internal view catalog in the materialized view management service 210. The internal view catalog may store information related to materialized views, including a name, definition, access controls or configuration, maintenance and/or other historical information to indicate the progress or performance of a materialized view (e.g., last time updated). Internal view catalog may store various state information or other metadata, such as metadata to describe the mappings between change logs for in-bound changes from source connector(s) 360 and out-bound changes to target connector(s) 370. In some embodiments, materialized view creation 355 may assign, provision, or initiate a materialized view incremental maintenance engine 350 to handle a materialized view (e.g., to obtain changes, generate view updates and store view updates to an out-bound log for the materialized view. Materialized view creation 355 may provide materialized view incremental maintenance engine(s) 350 assigned to a materialized view with the appropriate information (e.g., identifier for generated maintenance plan, identities of input and output logs for the data source(s) and target for the materialized view, etc.).

Materialized view management service 210 may support via interface 310 various APIs or other implemented source connectors 360, in various embodiments. Source connectors 360 may communicate with and obtain changes from data source(s) 304. In some embodiments, a source connector 360 may facilitate a change capture protocol or interface for a particular type of data store (e.g., a MySQL connector, a data stream connector, an object store connector) for a corresponding one of data source(s) 304. In some embodiments, source connectors 360 are implemented as part of a service or storage system implement data source(s) 304. As discussed above data source(s) 304 may be various services (or resources hosted within services) of provider network 200.

For example, source connectors 360 may enable a changed data capture stream supported by a source database, and register as a recipient, authorized reader, or other component capable of obtaining updates to that source as a change stream. In some embodiments, the data source may be a data stream, and thus the source connectors 360 may register or request to be a recipient of the data stream. In some embodiments, change data capture may poll for source changes. For example, data connector(s) 360 may record or maintain the state of previously received changes from a source (e.g., by timestamp, version identifier, etc.) and use the state to request changes that occurred since the last received state. The changes captured by source connectors may be sent via interface 310 to a source-specific change log (e.g., an append-only change log implemented via a log-based database, ledger database, or other log-structured storage) in a format corresponding to the hub data model (e.g., in ION format) via which materialized view incremental maintenance engines 350 may read from the logs of corresponding sources contributing to a view. Source connectors 360 may report source progress or performance information to control plane 320. In this way, control plane 320 may make performance determinations to adjust the performance of connectors, in some embodiments.

In some embodiments, various increment maintenance engines (internal table incremental maintenance engine 345, internal view incremental maintenance engine 346, materialized view incremental maintenance engine 356) may obtain respective maintenance plan or other execution plan for updating their respective resource from its dependent resource. For example, the internal table incremental maintenance engine 345 would update the internal table based on the source table of the source data store. A maintenance plan may describe the various operations for combining changes to various updates received from the data sources or intervening materialized view management service 210 resources (e.g., internal table or view) to provide an updated table/view/materialized view without regenerating the entire resource (e.g., without re-querying all sources to obtain all of the resource information). In some embodiments, view maintenance processing nodes may implement maintenance plan optimization to rewrite or utilize various features, such as intermediate results stored in intermediate tables and/or utilization local computational capabilities and storage, such as maintenance computation data (instead of using source computational storage and/or capabilities). In this way, view maintenance processing nodes may adapt to the capabilities of the data sources (e.g., supported or unsupported processing operations, such as supporting or not supporting joins, aggregations, etc.) or limitations on the data sources (e.g., read or write limitations on the data sources). In some embodiments, the various incremental maintenance engines 345, 346, 356 may rely upon external computation resources (e.g., compute function resource as discussed above with regard to FIG. 2 of compute services 220), which may perform an operation or determine a value used as part of updating a materialized view. In some embodiments, a resource-based authorization management 330 of the control plane 320 may be used to modify the resource-based authorization policies attached to the various resources, as further discussed in FIG. 5.

In some embodiments, materialized view incremental maintenance engine 356 may report progress and performance information to control plane 320. In this way, control plane 320 may evaluate the performance of operations to determine updates and make adjustments to scale the resources allocated to maintaining the materialized view to satisfy performance criteria.

Materialized view management service 210 may receive various requests to invoke the various features of a view creation process or workflow. For example, materialized view management service 210 may get source data from the source connector(s) 360 (e.g., via the append-only log or an initial batch upload, snapshot, or other information used to generate the initial version of the materialized view). In some embodiments, a data source may push the data (e.g., a stream of data) to materialized view management service 210. Alternatively, some data sources may allow for materialized view management service 210 to query or send requests to access the desired data for the materialized view (e.g., according to a result set definition for the materialized view). Materialized view management service 210 perform one or multiple requests to store the materialized view via target connector 370, in various embodiments. For example, materialize view management service 210 may store change log records or other information to an append-only log assigned to the materialized view and accessible to target connector(s) 370.

The requests to get source data may continue until the materialized view is created. Then, the materialized view may begin maintenance phase. Maintenance phase may allow for materialized view management service 210 to get (e.g., via the append-only logs for the various data sources) or otherwise respond to changes to the data sources (e.g., additional data, removed data, modified data, etc.) in order to compute or otherwise determine an update to a materialized view. For example, if a materialized view provides an aggregation function (e.g., summary, average, count, deviation, etc.) then materialized view management service 210 may add, divide, subtract, union, join, or other perform various other operations to determine updated values corresponding to the obtained changes. Materialized view management service 210 may then perform one or more requests to update the new version(s) of the materialized view(s) to include those changes at via target connector(s) 370 (e.g., via updates to the append only log for the materialized view).

For example, target connector(s) 370 may obtain the changes to be made to a materialized view, in various embodiments. In various embodiments, target connectors 370 may implement target-specified update translation. For example, target-specific update translation from the hub data model may be performed, including data type conversions, operation conversions, and/or generate the request parameters needed to perform an update request to make a corresponding change in the materialized view according to the interface of the target system. In some embodiments, target connector(s) 370 may enforce ordering constraints. In some embodiments, target connector(s) 370 may perform deduplication to prevent duplicate updates from being performed. For example, target connector(s) 370 may track the updates successfully performed (as discussed above) in order to prevent a failure from causing an already performed update from being re-performed.

Figure 4A:
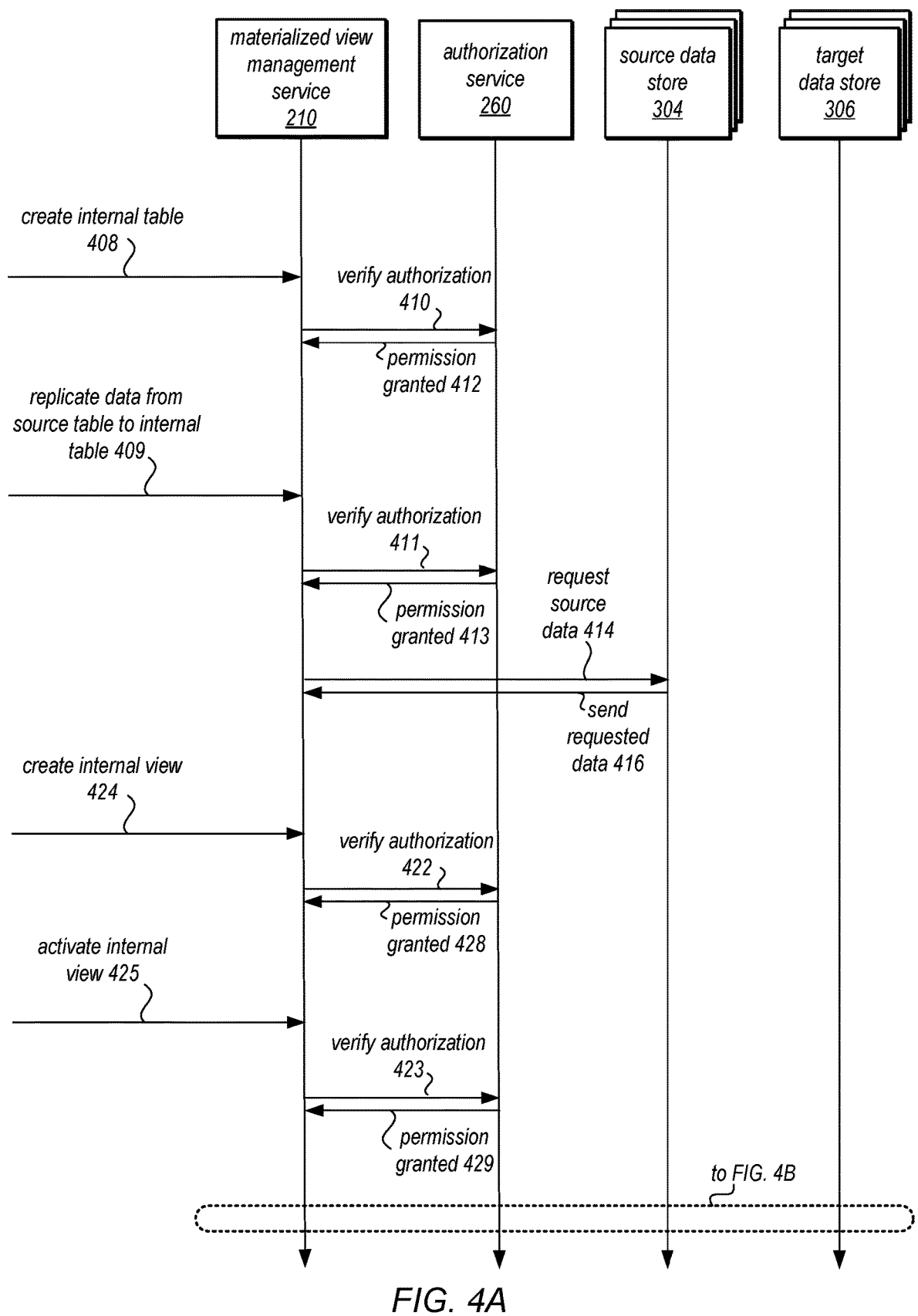
FIGS. 4A-B are sequence diagrams illustrating interactions for creation, activation, and maintenance of a data flow of a data pipeline by a materialized view management service using resource-based authorization policies, according to some embodiments.
Figure 4B:
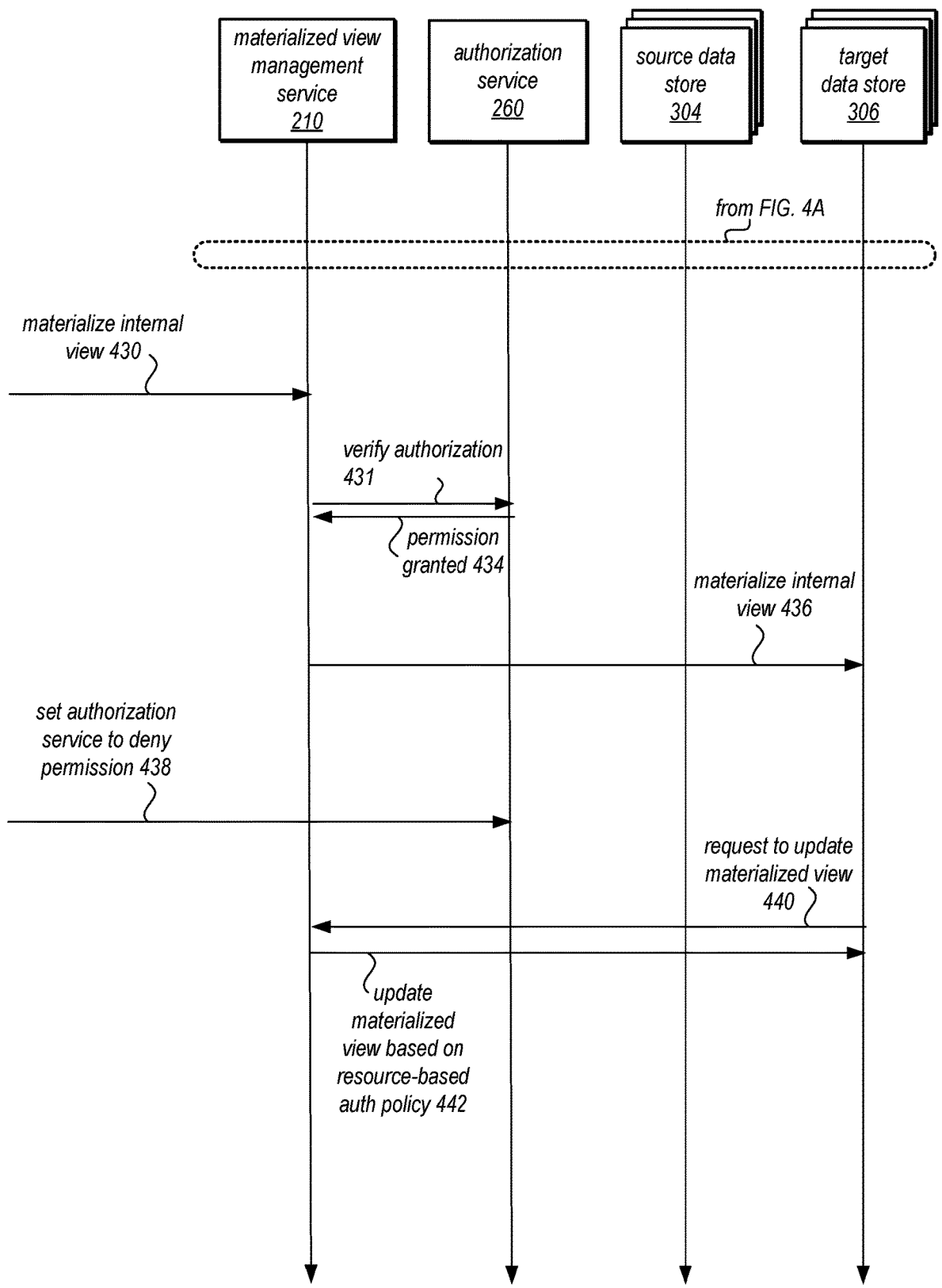

FIG. 4A-B are sequence diagrams illustrating interactions for creation, activation, and maintenance of a data flow of a data pipeline by a materialized view management service using resource-based authorization policies, according to some embodiments. In some embodiments, the various requests for actions sent to the materialized management service 210 may occur via interface 310. The various request to the materialized view management service 210 may include or specify the data source(s), data target(s), and view definition that the materialized view is to provide, in some embodiments. In some embodiments, the creation request may provide the access credentials (e.g., user id, password, etc.) or other permissions to allow the creation of the materialized view and update of the materialized view in the target.

As illustrated in FIG. 4A, to create the data pipeline, the materialized view management service 210 receives a request from a client or other entity to create an internal table and to replicate data from source table to the internal table 408. In order to execute the request, the materialized view management service 210 verifies the authorization policy 410 attached to the object in the authorization service corresponding to the account or entity that has made the request with the authorization service 260, and upon a response that permission is granted 412, the materialized view management service 210 creates an internal table that contains a specific schema. Because the create request is separate from the replicate data request, the internal table may contain only the schema and may not yet contain any data. Once the internal table has been created, a replicate data from source table to internal table 409 a may be received by the materialized view management service 210. The replication request may involve similar verification of the authorization policy 411 by the authorization service 260 for the materialized view management service 210 to execute the request. If the permission is granted 413, the materialized view management service 210 begins replication of data from a requested table of the source data store by requesting source data 414 to the target data store 306 identified by the initial request 408. Once the target data store 306 sends the requests data 416, the account or entity may author an internal view based on the populated internal table.

To create the internal view, the account or entity may request to create an internal view 424 that contains the transformations/business logic and mappings involving one or more internal tables in order to generate the internal view. In order to execute the request to create the internal view 424, the materialized view management service 210 verifies the authorization policy 422 attached to the account or entity that has made the request with the authorization service 260, and upon a response that permission is granted 428, the materialized view management service 210 creates the internal view based on the one or more internal tables. In some embodiments, the created view may be required to be activated using an activate internal view 425 request in order to process the data received from the internal tables. The activate internal view 425 request furthermore may be authorized by verifying authorization policy 423 of the entity sending the request in order for the materialized view management service 210 to begin processing the data to generate the internal view. Upon verification by the authorization service 260 that permission is granted 429, the activated internal view may furthermore process incoming updates to various internal tables and reflect updates in the internal view.

Continuing on to FIG. 4B, the account or entity may send a request to materialize internal view 430 to a desired target data store. To materialize the view, the authorization service 260 may verify authorization 431 based on the policy that is attached to an object corresponding to the entity that made the request and upon verification that permission is granted 434, the materialized view management service 210 may materialize the internal view 436 in the target data store 406. In some embodiments, each one of the requests made by the account or entity to the materialized view management service 210 may be a control-plane action taken by the entity that creates or updates a resource-based authorization policy pertaining to respective resources that the policies affect. For example, based on the activate internal view 424 request, the materialized view management service 210 may create a resource-based authorization policy associated with the activated internal view granting permission to other data-plane actions involved in maintaining the data flow in the pipeline described above. In some embodiments, the account or entity may issue requests to assign a resource-based policy to a resource directly and not as a subsequent action taken by the materialized view management service. Various accounts or entities may assign, remove, or retrieve a resource-based policy assigned to any resources of the materialized view management service 210 based on verification of permission to change the resource-policy through the authorization service 260.

In some embodiments, changes in the permissions in the authorization service 260 may be de-coupled to resource-based authorization policies and subsequent data-plane actions remain unaffected by changes in the authorization service 260. For example, the authorization service 260 may receive a request to set authorization service to deny permissions 438 of the account or entity that created the internal table/view and may prevent future control-plane actions issued by that entity to be rejected. However, the request to update materialize view 440 by the target data store 306 may nevertheless be granted permission based on the resource-based authorization policy generated prior to the request to deny permission 438. The resource-based authorization policy may be separate and independent of the policy reflected in the authorization service 260. Based The materialized view management service 210 may update the materialized view based on the resource-based authorization policy 442 regardless of the status on the authorization service. The use of resource-based authorization policy attached to the respective resource of the materialized view management service 210 provides pipeline resiliency by removing unnecessary coupling between a policy authorizing the actions to create and activate stages in the data pipeline at the authorization service 260 and the separately maintained policies that authorize subsequent data flow requests in the pipeline. In some embodiments, the data-plane actions may be recurrent and may involve actions that continuous refresh the internal table/view in a data pipeline, such as read internal table, read internal view, etc.

Figure 5:
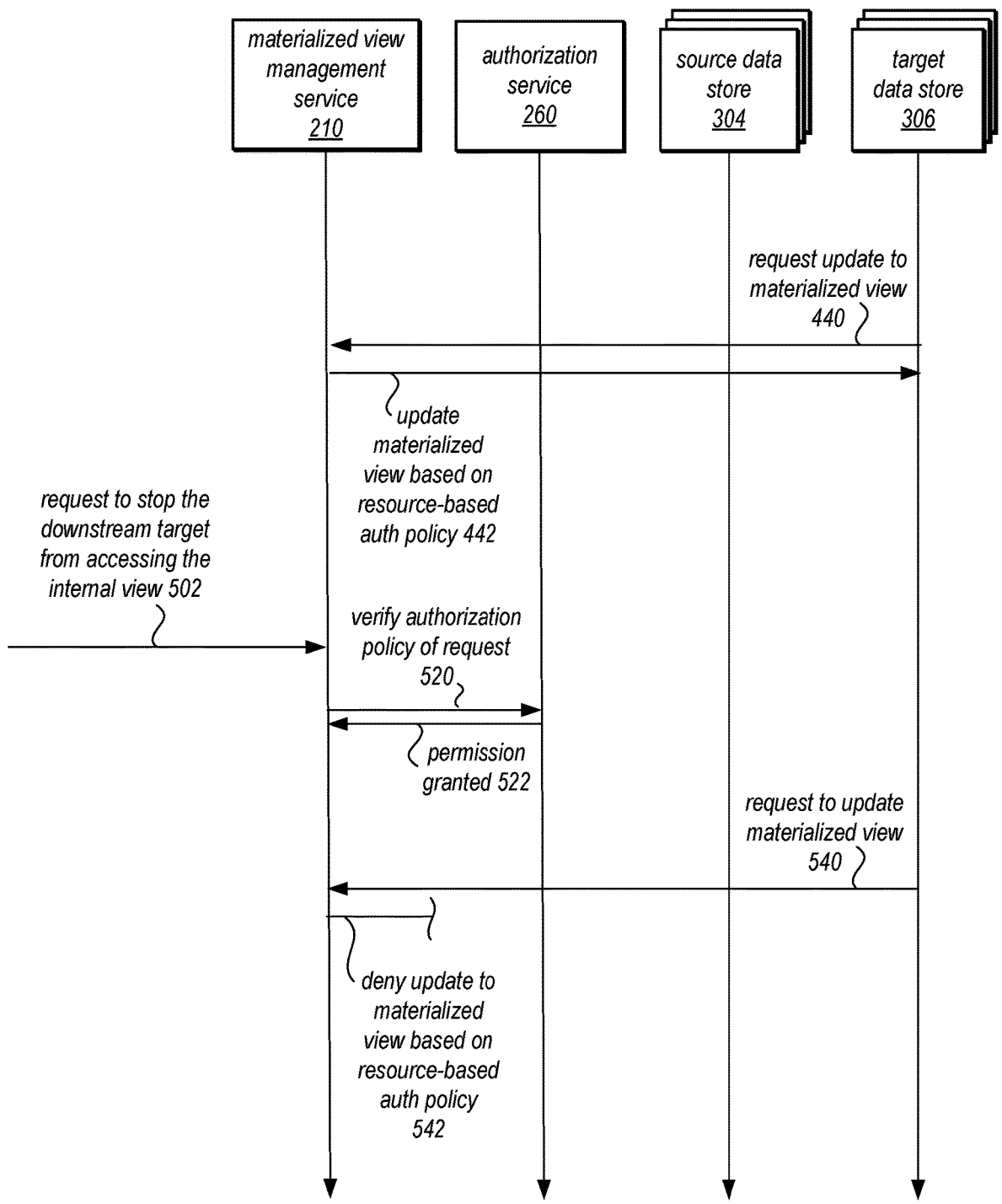
FIG. 5 is a sequence diagram based on FIG. 4 further illustrating interactions for restricting data flow of a data pipeline through a materialized view management service using resource-based authorization policies, according to some embodiments.

Various resource-based policy actions may be used to control the data-plane actions maintaining data flow of a pipeline. FIG. 5 is a sequence diagram based on FIG. 4 further illustrating interactions for restricting data flow of a data pipeline through a materialized view management service using resource-based authorization policies, according to some embodiments. As indicated at 440, a target data store 306 may request updates to a materialized view management service 210 having a resource-based authorization policy. The resource-based authorization policy may be used by the materialized view management service 210 to verify that the target data store 306 has permission and may update the materialized view based on the resource-based authorization policy 442. In some embodiments, an account or entity may issue a resource-based policy requests to assign a resource-based policy to a resource directly and not as a subsequent action taken by the materialized view management service 210.

Various accounts or entities may assign, remove, or retrieve a resource-based policy assigned to any resources of the materialized view management service 210 based on verification of permission through the authorization service 260. For example, an account or entity may request to set the resource-based authorization policy to deny the downstream target data store from accessing the internal view 502. In some embodiments, the request to deny downstream target data store access to internal view 502 may be invoked through an API command that immediately cancels further data flow to the target data store 306 or other downstream resources. Once the API command is received, the materialized view management service 210 may automatically remove or update the associated resource-based authorization policy. In other embodiments, the API command may be directed towards an internal table or other resources to stop any downstream targets from accessing the internal table or other resources. The materialized view management service 210 may receive and verify the authorization policy associated with the request 520 (e.g., according to an identity of an account or other user associated with the request 502) and determine that the entity has permission to modify the resource-based authorization policy. Upon receiving that the permission is granted 522, the materialized view management service 210 modifies the authorization policy attached to the internal view identified in the request to either remove the target data store 306 from a list of allowed targets and/or add the target data store 306 to a list of disallowed targets.

Once the materialized view management service 210 receives a request to update the materialized view 540 or other requests associated with the request (e.g., request to read internal view data), the materialized view management service 210 denies the update to the materialized view based on the resource-based authorization policy attached to the internal view 542. In some embodiments, a scenario may arise involving a pipeline wherein an upstream resource (internal table or internal view) of the pipeline grants access to one or more multiple downstream resources (internal views and/or materialized views of a target data store) including a read permission stored in the resource-based authorization policy. In this scenario, in order to immediately cancel further data flow to the multiple downstream resources, a specific cancel internal table/view data flow request may be invoked to change the resource-based authorization policy to block or otherwise de-authorize the upstream resource from forwarding data to the downstream resource. However, unless the authorization service 260 is also updated accordingly, the account or identity used to generate the data flow of the pipeline may create another pipeline similar to the first. While updating the resource-based authorization policy stops the flow of data to the downstream resource, it may not prevent the entity that originally started/materialized the downstream resource from creating another one that achieves the same purpose of the one that was canceled—an explicit request to stop the data flow may be required.

Figure 6:
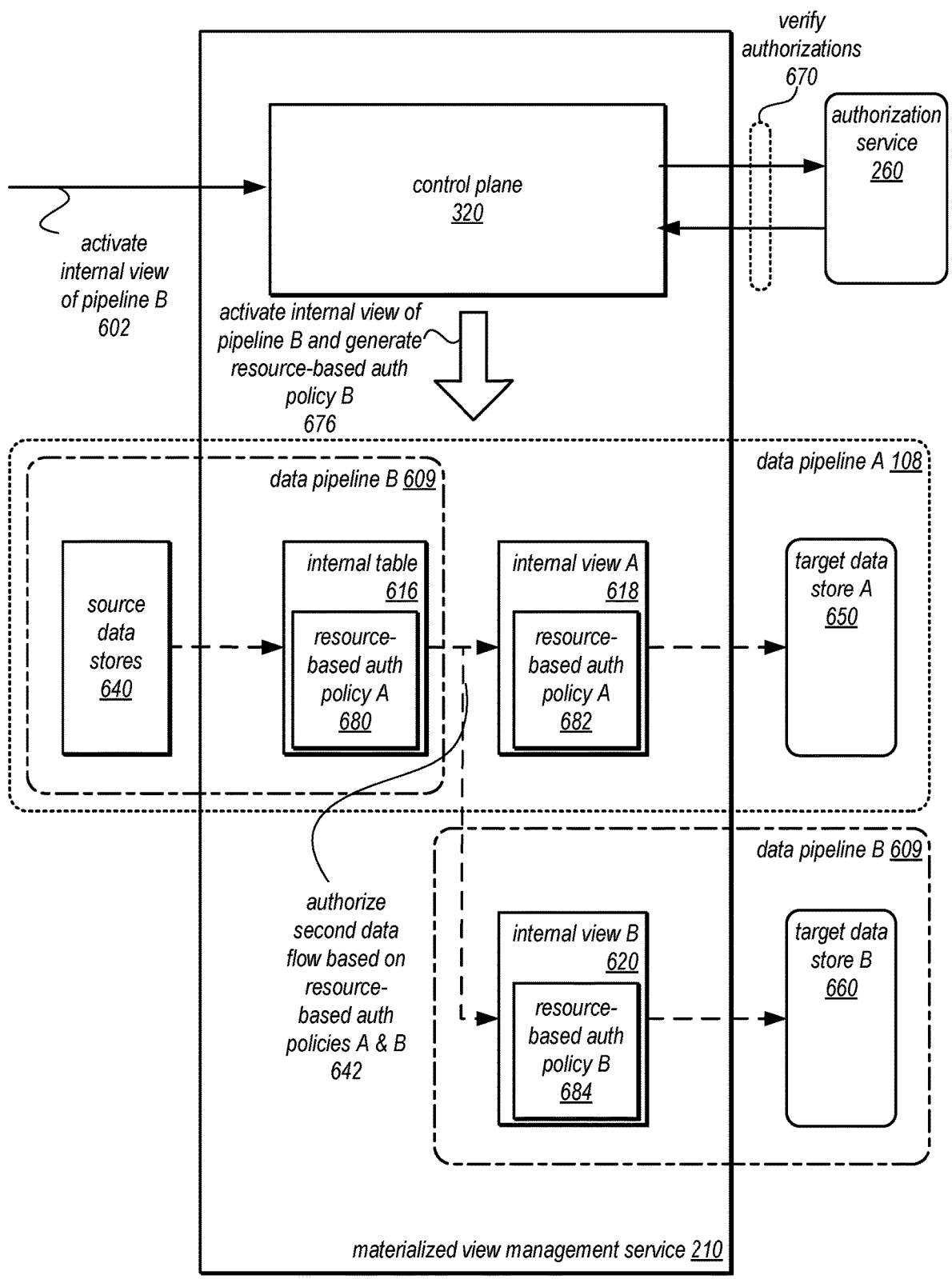
FIG. 6 is a logical block diagram illustrating a materialized view management service that uses resource-based authorization policies to maintain multiple data flows of multiple data pipelines, according to some embodiments.

FIG. 6 is a logical block diagram illustrating a materialized view management service that uses resource-based authorization policies to maintain multiple data flows of multiple data pipelines, according to some embodiments. In some embodiments, a data pipeline A 608 (similar to data pipeline 608 of FIG. 1) may comprise materialized view management service 220, wherein the data pipeline A 608 may be a set of actions that take raw data from one or more source data stores 640, process the data, and move or materialize the data 636 to a target data store A 650 for storage and analysis. Each of the source data stores 640, resources of the materialized view management service 210, and target data store A 650 that interact with the data pipeline 608 may utilize various authentication mechanisms and actions. In addition to data pipeline A 608, a data pipeline B 609 may be a set of actions that take raw data from one or more source data stores 640, process the data, and move or materialize the data 636 to a target data store B 660 for storage and analysis. Each of the source data stores 640, resources of the materialized view management service 210, and target data store B may similarly utilize various authentication mechanisms and actions.

In some embodiments, an activate internal view of pipeline B 602 action is performed upon verification of the authorization policy B 604 against an authorization service 260. Various control plane 320 actions may be requested to create the respective data pipeline A 608 and pipeline B 609 such as create an internal table 616, replicate data from a source table of the source data store 640 to the internal table 616, create an internal view A 618, and create an internal view B 620. The pipeline A may be created from various requests using entity-based authorization policies of account A or entity A, whereas the pipeline B may be created through requests using the entity-authorization policy of account B or entity B. Although not illustrated, the materialized view management service 210 may contain multiple variations of pipelines wherein the internal table, internal view, source data store, and target data store may be created by different entities. For example, in some embodiments, the source data store 640, internal table 616, internal view A 618, and target data store A 650, may all be associated with different entities and may require respective resource-based authorization policy to allow data flow amongst each of the resources. The authorization service 260 may receive an authorization policy (such as authorization policy B 604) for the respective entity (e.g., a user, a group, a role, an account, etc.) attached to each of the requests, and verify that the entity has permission to perform the actions. In order for internal view B 618 to be created, resource-based authorization policy A 618 must first grant access of the internal table 616 to account B or entity B. The resource-based authorization policy A 618 may authorize account B to generate an internal view B 618 during resource-based policy generated during the creation of the internal table 616 or through a separate control-plane request to modify the resource-based policy. In some embodiments, in order for internal view B 618 to be generated, both the entity-based authorization policy and the resource-based authorization policy may be required to grant permission. In the case that there are no explicit permissions, a lack of disallowed accounts or entities may be sufficient to create the internal view or any other resources of the materialized view management service 210.

Once the authorization service 260 verifies the authorization policy 604 of the entity initiating the activate internal view of pipeline B has permission, the materialized view management service 220 may activate internal view B of the pipeline B 609 and generate resourced-based authorization policy 684. A resource may be any component of the materialized view management service 220 that stores or processes data, such as a source table, the internal table 616, the internal view A 618, etc. Although FIG. 6 illustrates creation of resource-based authorization policy 684 as based on the activate internal view B 602 action, various other actions may trigger similar generation of one or more resource-based authorization policies. For example, various control plane actions involved in the creation of the data pipeline A and B 608, 609 may also trigger one or more resource-based authorization policies associated with the internal table 616/internal view A 618/internal view B 618 to be created or updated.

After the internal view B 618 is activated and one or more resource-based authorization policies are generated, the materialized view management service 220 may maintain the data flow of the data pipeline A 608 and data pipeline B 609 through recurrent data streaming actions occurring in a data-plane. For example, data in internal table 616 or internal view B 618 may be accessed by the target data store B 660 via an internal view action (e.g., queries, data pull requests, downloads, etc.). In some embodiments, an interface supported by the target data store B 660 may be used to access the internal table 616 or internal view A 618, in various embodiments. For example, a SQL query may be made to access data stored as a view if target data store B 660 is a relational database that supports SQL. If, however, target data store B 660 were stored in a non-relational database, then a request according to the programming language or interface of the non-relational database may be used to access the stored data instead. In this way, data may be deployed to targets that support the desired features for analyzing and accessing the data. In some embodiments, a requested action may be an internal action of the materialized view management service 220. For example, an internal table action may be an internal request for data in the internal table 616 by the internal view B 620 to populate its view. In a cross-account situation involving data flow between multiple resources of different data pipelines, both resource-based policies of the source and target resources must permit the action. For example, the request made by the internal view B 620 in the data pipeline B 609 to update the internal view may be authorized according to resource-based authorization policies A and B 642.

Figure 7:
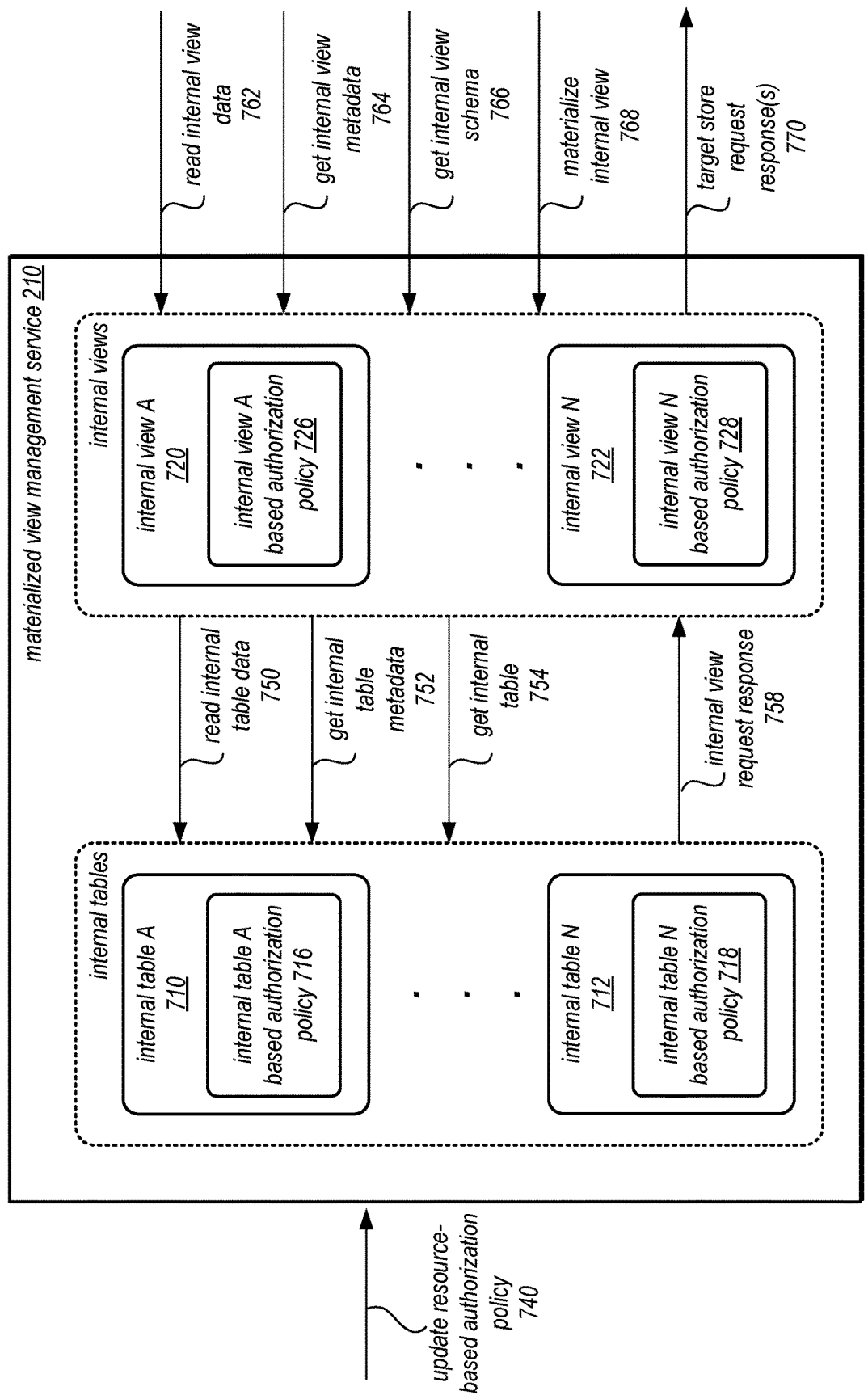
FIG. 7 is a logical block diagram illustrating available table or view actions may be authorized using resource-based policies in a materialized view management service having multiple resources, according to some embodiments.

FIG. 7 is a logical block diagram illustrating available table or view actions may be authorized using resource-based policies in a materialized view management service having multiple resources, according to some embodiments. In some embodiments, a materialized view management service 210 may have multiple resources within such as internal table A 710 through internal table N and internal view A through internal view N 722. The various resources may contain a corresponding resource-based authorization policy such as internal table A based authorization policy 716 and internal table N based authorization policy 718 to internal view A based authorization policy 726 and internal view N based authorization policy 728. The respective resource-based authorization policy may be generated indirectly by the materialized view management service 210 upon creation or directly through requests to assign resource-based policy to that resource. In some embodiments, various accounts or entities may assign, remove, or retrieve a resource-based policy assigned to any resources of the materialized view management service 210 through a request to update resource-based authorization policy 740. The various internal tables and internal views of the materialized view management service 210 may be created through requests from different accounts or entities as discussed in FIG. 6. The resource-based authorization policy may be generated by using a unique resource name of a resource to attach the resource policy to, creating a resource-based authorization policy document such as a JSON document that describe the authorization policy of the resource, and associating the resource-based authorization policy to the resource using an API based on the unique resource name.

Furthermore, as discussed in FIG. 6, multiple data pipelines may be generated from the various internal tables and internal views. Once created, data flows of various combination of internal tables and views may be maintained without relying on an external authorization service, as discussed in FIG. 2, through the various resource-based authorization policies. In some embodiments, these resource-based authorization policies may be attached to a single internal table or internal view and may only affect the resource to which it is attached to. For example, a read internal table data 750 action directed towards internal table A 710 may only be authorized by the internal table A-based authorization policy 716 and may not be authorized policy attached to another table, such as internal table N-based authorization policy 716.

In some embodiments, a resource-based authorization policy may only authorize actions that match the resource type. For example, the internal view A based authorization policy 726 attached to the internal view 720 may only authorize internal view actions not internal table actions. In some embodiments, only a subset of table or view actions that are required for maintaining the data flow may be authorized using resource-based policies. These actions including read internal table data 750, get internal table metadata 752, gent internal table 754, read internal view data 762, get internal view metadata 764, get internal view schema 766, and materialize internal view 768, in some embodiments. Based on the respective resource-based authorization policy, the various internal tables and views may respond with respective internal view request response 758 and target store request response 770.

Although FIGS. 2-7 have been described and illustrated in the context of a provider network implementing a materialized view management service, the various components illustrated and described in FIGS. 2-7 may be easily applied to other data processing systems that store data across different sources and targets. As such, FIGS. 2-7 are not intended to be limiting as to other embodiments of a system that may a resource-based authorization policy.

Figure 8:
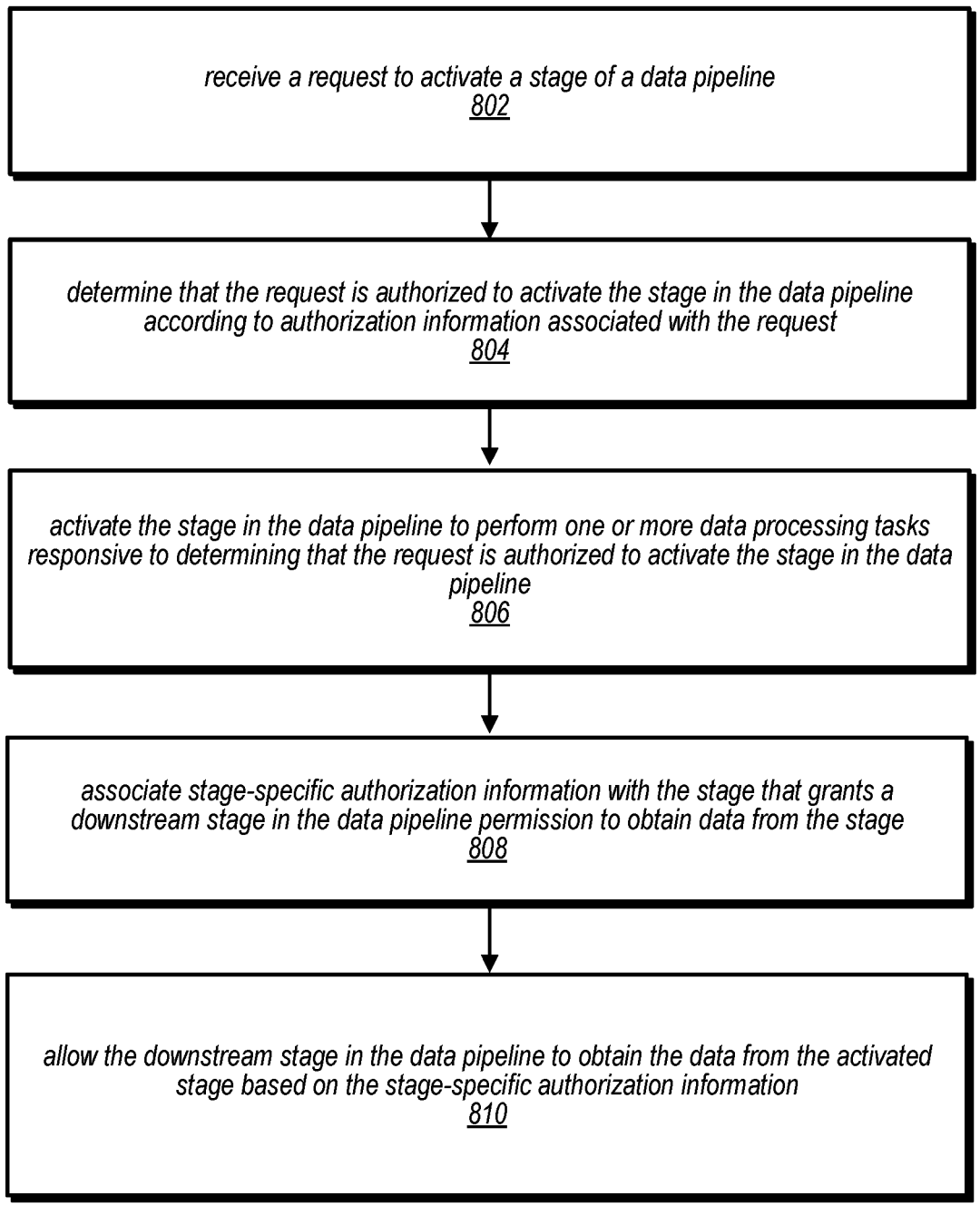
FIG. 8 is a high-level flowchart illustrating various methods and techniques to implement allowing stage-specific authorization control in a data processing system for self-maintaining resources of a pipeline capable of performing refresh action on a continuing basis, according to some embodiments.

FIG. 8 is a high-level flowchart illustrating various methods and techniques to implement allowing stage-specific authorization control in a data processing system for self-maintaining resources of a pipeline capable of performing refresh action on a continuing basis, according to some embodiments. Various different systems and devices may implement the various methods and techniques described below, either singly or working together. For example, a data processing system or materialized view management service such as described above with regard to FIGS. 1-7 may implement the various methods. Alternatively, a combination of different systems and devices may implement these methods. Therefore, the above examples and or any other systems or devices referenced as performing the illustrated method, are not intended to be limiting as to other different components, modules, systems, or configurations of systems and devices.

As indicated at 802, a data processing system may receive a request to activate a stage of a data pipeline, wherein the request includes authorization information via an interface of the view management system. In some embodiments, one or more of the requests made by the account or entity to the data processing system may be a control-plane action taken by the same entity that has requested to create the data pipeline being activated. In some embodiments, a user interface or other type of interface such as an API of the data processing system may be used to specify the data processing job, including the desired results, sources, and targets.

As indicated at 804, the data processing system may determine that the request is authorized to activate the stage in the data pipeline. In some embodiments, as discussed with regard to FIG. 1, the data processing system may send the entity-based authorization information attached to the request to an authorization service to verify that the control-plane action has permission.

As indicated at 806, responsive to a determination that the request is authorized to activate the stage in the data pipeline, the data processing system may activate the stage in the data pipeline to perform one or more data processing tasks. In some embodiments, the stage may process data received from multiple upstream stages.

As indicated at 808, the data processing system may associate stage-specific authorization information with the stage that grants a downstream stage in the data pipeline permission to obtain data from the stage responsive to the determination that the request is authorized to activate the stage in the data pipeline. For example, the stage-specific authorization information may be associated to stage of a certain type such as an internal table or view. In some embodiments, only a subset of available stage actions may be authorized using the associated stage-specific policies including get stage, get stage schema, materialize stage, etc. In some embodiments, this subset of actions may be limited only to actions that are required for maintaining the data flow.

As indicated at 810, the data processing system may allow the downstream stage in the data pipeline to obtain the data from the activated stage based on the stage-specific authorization information. In some embodiments, the data processing system may obtain the one or more changes at the request of the downstream stage, wherein the request may be authorized based on the permission given by the stage-specific authorization information. As discussed above with regard to FIGS. 6 and 7, multiple stage such as multiple internal view, internal tables, and target source data may be involved in the data pipeline. In some embodiments, instead of requiring the authorization service to verify permissions for all actions required to maintain the data flow, only an initial control-plane action such as activate stage may be verified against the authorization service—authorization for the actions used to maintain data flow such as materialize stage may be verified against the stage-specific authorization information. Authorization may be performed internally as part of the data processing system, or in other embodiments, externally, such as by an authorization service.

Figure 9:
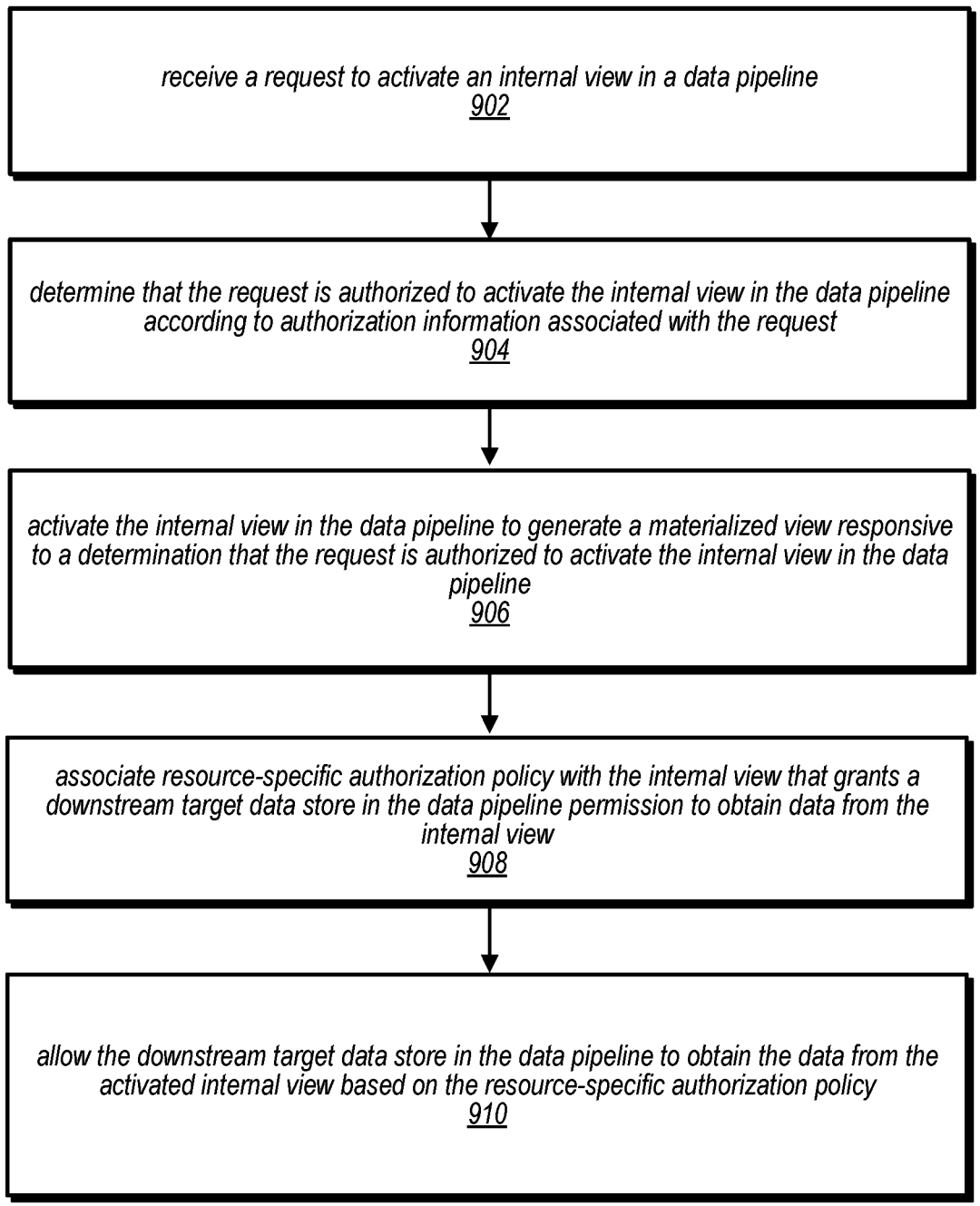
FIG. 9 is a high-level flowchart illustrating various methods and techniques to implement allowing resource-based authorization control in a materialized view management service for self-maintaining resources of a pipeline capable of performing refresh action on a continuing basis, according to some embodiments.

FIG. 9 is a high-level flowchart illustrating various methods and techniques to implement allowing resource-based authorization control in a materialized view management service for self-maintaining resources of a pipeline capable of performing refresh action on a continuing basis, according to some embodiments. Various different systems and devices may implement the various methods and techniques described below, either singly or working together. For example, a data processing system or materialized view management service such as described above with regard to FIGS. 1-7 may implement the various methods. Alternatively, a combination of different systems and devices may implement these methods. Therefore, the above examples and or any other systems or devices referenced as performing the illustrated method, are not intended to be limiting as to other different components, modules, systems, or configurations of systems and devices.

As indicated at 902, a materialized view management service may receive a request to activate an internal view in a data pipeline. In some embodiments, one or more of the requests made by the account or entity to the materialized view management service may be a control-plane action taken by the same entity that has requested to create the data pipeline being activated. In some embodiments, a user interface or other type of interface such as an API of the materialized view management service may be used to specify the data processing job, including the desired results, sources, and targets.

As indicated at 904, the materialized view management service may determine that the request is authorized to activate the internal view in the data pipeline according to the authorization information associated with the request. In some embodiments, as discussed with regard to FIG. 1, the materialized view management service may send a request to an authorization service to verify that the control-plane action has permission according to policy attached to an account associated with the request.

As indicated at 906, responsive to a determination that the request is authorized to activate the internal view in the data pipeline, the materialized view management service may activate the internal view in the data pipeline to generate a materialized view. In some embodiments, the internal view may process data received from multiple internal tables.

As indicated at 908, the materialized view management service may associate resource-specific authorization policy with the internal view that grants a downstream target data store in the data pipeline permission to obtain data from the internal view responsive to the determination that the request is authorized to activate the internal view in the data pipeline. For example, the resource-based authorization policy may be associated to an internal view. In some embodiments, only a subset of available table or view actions may be authorized using the associated resource-based policies including get table, get table schema, read table, get view, get view schema, materialize view, read view, etc. In some embodiments, this subset of actions may be limited only to actions that are required for maintaining the data flow.

As indicated at 910, the materialized view management service may allow the downstream target data store in the data pipeline to obtain the data from the activated internal view based on the resource-specific authorization policy. In some embodiments, the materialized view management service may obtain the one or more changes at the request of the downstream target data store, wherein the request may be authorized based on the permission given by the resource-based authorization information. As discussed above with regard to FIGS. 6 and 7, multiple internal view, internal tables, and target source data may be involved in the data pipeline. In some embodiments, instead of requiring the authorization service to verify permissions for all actions required to maintain the data flow, only an initial control-plane action such as activate internal view may be verified against the authorization service—the actions used to maintain data flow such as materialize view may be verified against the resource-specific authorization policy.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 10:
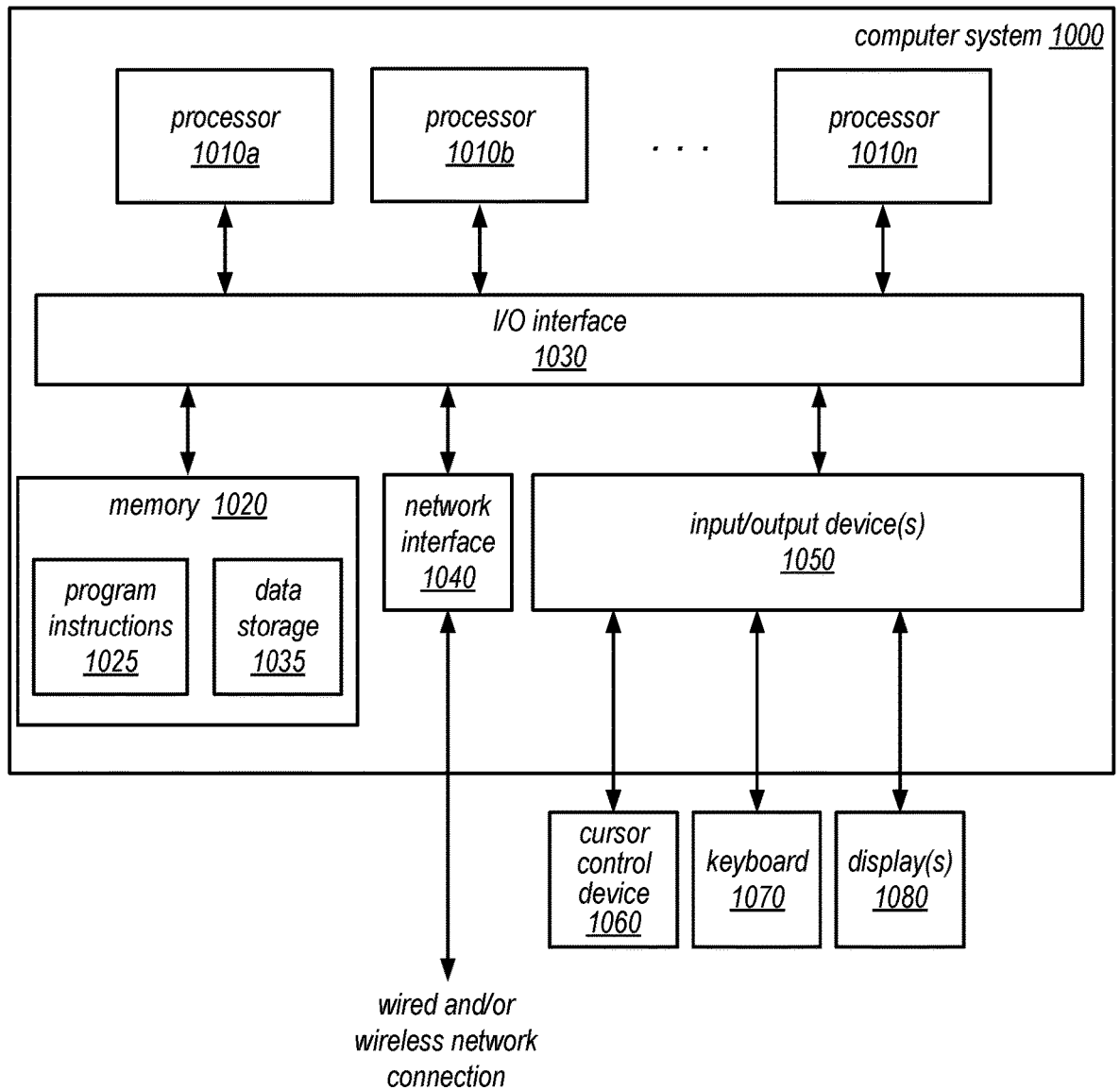
FIG. 10 illustrates an example system configured to implement the various methods, techniques, and systems described herein, according to some embodiments.

Embodiments of resource-based authorization policies to maintain a data flow of a data pipeline as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system compute system, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies, or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent, or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing, or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example, via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, may implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that may perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement a view management system, the view management system configured to:
   receive, via an interface of the view management system, a request to activate an internal view in a data pipeline;
   determine that the request is authorized to activate the internal view in the data pipeline according to an authorization policy associated with the request;
   responsive to a determination that the request is authorized to activate the internal view in the data pipeline:
   activate, by the view management system, the internal view in the data pipeline to generate a materialized view;
   associate, by the view management system, a resource-specific authorization policy with the internal view that grants a downstream target data store in the data pipeline permission to obtain data from the internal view to generate the materialized view in the target data store; and
   allow, by the view management system, the downstream target data store in the data pipeline to obtain the data from the activated internal view based on the resource-specific authorization policy.

2. The system of claim 1, wherein the view management system is further configured to:

associate, by the view management system, a second resource-specific authorization policy with an internal table that grants the internal view in the data pipeline permission to obtain table data from the internal table, wherein the internal view is downstream from the internal table in the data pipeline; and allow, by the view management system, the internal view in the data pipeline to obtain the table data from the internal table based on the second resource-specific authorization policy.

3. The system of claim 1, wherein the view management system still allows the downstream target data store in the data pipeline to obtain the data from the activated internal view based on the resource-specific authorization policy after a determination that an account associated with the request to activate the internal view is no longer authorized to activate the internal view based on an update to the authorization policy.

4. The system of claim 1, wherein the view management system is further configured to:

responsive to a request to stop the downstream target data store from accessing the internal view, update the resource-specific authorization policy associated with the internal view to deny the downstream target data store in the data pipeline permission to obtain the data from the internal view.

5. A method, comprising:

receiving, at a data processing system, a request to activate a stage of a data pipeline;

determining, by the data processing system, that the request is authorized to activate the stage in the data pipeline according to authorization information associated with the request;

responsive to determining that the request is authorized to activate the stage in the data pipeline:

activating, by the data processing system, the stage in the data pipeline to perform one or more data processing tasks;

associating, by the data processing system, stage-specific authorization information with the stage that grants a downstream stage in the data pipeline permission to obtain data from the stage;

allowing, by the data processing system, the downstream stage in the data pipeline to obtain the data from the activated stage based on the stage-specific authorization information.

6. The method of claim 5, wherein the stage of a data pipeline is an internal view in the data pipeline, and the downstream stage is a target data store in the data pipeline that stores a materialized view generated from the internal view.

7. The method of claim 5, wherein the authorization information is an authorization policy for an account associated with the request to activate the stage and wherein after an update to the authorization policy that de-authorizes the account from activating the stage in the data pipeline, the data processing system still allows the downstream stage in the data pipeline to obtain the data from the activated stage based on the stage-specific authorization information.

8. The method of claim 5, further comprising:

responsive to a request to stop the downstream stage from accessing the stage, updating the stage-specific authorization information associated with the stage to deny the downstream stage in the data pipeline permission to obtain the data from the stage.

9. The method of claim 5, further comprising:

receiving, at the data processing system, a second request to create second stage in a second data pipeline;

determining, by the data processing system, that the second request is authorized to create the second stage in the second data pipeline according to second authorization information associated with the second request;

responsive to determining that the second request is authorized to create the second stage in the second data pipeline:

creating, by the data processing system, the second stage in the second data pipeline to receive data from the stage based on the stage-specific authorization information;

associating, by the data processing system, a second stage-specific authorization information with the second stage that grants a second downstream stage in the second data pipeline permission to obtain data from the stage; and allowing, by the data processing system, the second downstream stage in the second data pipeline to obtain the data from the second stage based on the second stage-specific authorization information.

10. The method of claim 9, further comprising:

receiving, at the data processing system, a third request to create a third downstream stage in a third data pipeline, wherein the first request is from a first account, the second request is from a second account, and the third request is from a third account;

determining, by the data processing system, that the third request is authorized to create the third downstream stage in the third data pipeline according to third authorization information, wherein the first pipeline is associated with the first account, the second pipeline is associated with the second account, and the third pipeline is associated with the third account;

responsive to determining that the request is authorized to create the third downstream stage in the third data pipeline:

creating, by the data processing system, the third downstream stage in the third data pipeline to receive data from the second stage based on the second stage-specific authorization information;

allowing, by the data processing system, the third downstream stage in the third data pipeline to obtain the data from the second stage based on the second stage-specific authorization information.

11. The method of claim 5, wherein the stage-specific authorization information grants permission to access only the stage to which it is associated with and not access to another stage.

12. The method of claim 5, wherein the stage is an internal view and wherein the stage-specific authorization information only grants permission for actions towards views and not towards other resource types.

13. The method of claim 5, wherein the data processing system is a view management system and wherein the stage-specific authorization information grants permissions for actions to get an internal table, get an internal table schema, read an internal table, get an internal view, get an internal view schema, materialize an internal view, and read an internal view.

14. One or more non-transitory, computer-readable storage media, storing program instructions that when executed on or across one or more computing devices cause the one or more computing devices to implement:

receiving, via an interface of a view management system, a request to activate an internal view in a data pipeline;

determining that the request is authorized to activate the internal view in the data pipeline according to authorization information associated with the request;

responsive to determining that the request is authorized to activate the internal view in the data pipeline:

activating, by the view management system, the internal view in the data pipeline to generate a materialized view;

associating, by the view management system, resource-specific authorization information with the internal view that grants a downstream target data store in the data pipeline permission to obtain data from the internal view; and allowing, by the view management system, the downstream target data store in the data pipeline to obtain the data from the activated internal view based on the resource-specific authorization information.

15. The one or more non-transitory, computer-readable storage media of claim 14, storing further instructions that when executed on or across the one or more computing devices, cause the one or more computing devices to further implement:

associating, by the view management system, a second resource-specific authorization information with an internal table that grants the internal view in the data pipeline permission to obtain table data from the internal table; and allowing, by the view management system, the internal view in the data pipeline to obtain the table data from the internal table based on the second resource-specific authorization information.

16. The one or more non-transitory, computer-readable storage media of claim 14, wherein the authorization information is an authorization policy for an account associated with the request to activate the stage and wherein after an update to the authorization policy that de-authorizes the account from activating the stage in the data pipeline, the data processing system still allows the downstream stage in the data pipeline to obtain the data from the activated stage based on the stage-specific authorization information.

17. The one or more non-transitory, computer-readable storage media of claim 14, storing further instructions that when executed on or across the one or more computing devices, cause the one or more computing devices to further implement:

responsive to a request to stop the downstream target data store from accessing the internal view, updating the resource-specific authorization information associated with the internal view to deny the downstream target data store in the data pipeline permission to obtain the data from the internal view.

18. The one or more non-transitory, computer-readable storage media of claim 14, wherein the authorization information is attached to an account object in an authorization service, wherein the account object represents an account associated with the request to activate the internal view and wherein determining that the request is authorized to activate the internal view in the data pipeline is made based on a response from the authorization service that performed a policy lookup for the account to indicate that the request to activate the internal view is authorized.

19. The one or more non-transitory, computer-readable storage media of claim 14, wherein the resource-specific authorization information is attached to an object in an authorization service that represents the internal view and wherein the allowing of the downstream target data store in the data pipeline to obtain the data from the activated internal view is based on a response from the authorization service that performed a policy lookup for the internal view to indicate that obtaining the data from the internal view for the downstream target data store is authorized.

20. The one or more non-transitory, computer-readable storage media of claim 14, wherein the view management system is further configured to:

associate, by the view management system, a second resource-specific authorization information with an internal table that grants the internal view in the data pipeline permission to obtain table data from the internal table, wherein the internal view is downstream from the internal table in the data pipeline; and allow, by the view management system, the internal view in the data pipeline to obtain the table data from the internal table based on the second resource-specific authorization information.

\* \* \* \* \*